(12) United States Patent
Aluru et al.

(10) Patent No.: US 10,777,021 B2
(45) Date of Patent: Sep. 15, 2020

(54) VIRTUAL REPRESENTATION CREATION OF USER FOR FIT AND STYLE OF APPAREL AND ACCESSORIES

(71) Applicant: Soul Vision Creations Private Limited, Bangalore (IN)

(72) Inventors: Sravanth Aluru, Bangalore (IN); Gaurav Baid, Bangalore (IN); Sarbartha Sengupta, Bangalore (IN); Sweenal Lale, Bangalore (IN)

(73) Assignee: Soul Vision Creations Private Limited (IN)

( * ) Notice: Subject to any disclaimer, the term of this patent is extended or adjusted under 35 U.S.C. 154(b) by 0 days.

(21) Appl. No.: 16/204,973

(22) Filed: Nov. 29, 2018

(65) Prior Publication Data

US 2019/0266795 A1 Aug. 29, 2019

Related U.S. Application Data

(60) Provisional application No. 62/636,157, filed on Feb. 27, 2018.

(51) Int. Cl.
*G06T 17/00* (2006.01)
*G06T 19/20* (2011.01)
(Continued)

(52) U.S. Cl.
CPC .............. *G06T 19/20* (2013.01); *G06F 16/54* (2019.01); *G06F 30/20* (2020.01);
(Continued)

(58) Field of Classification Search
CPC ......... G06T 17/20; G06T 19/00; G06T 17/00; G06T 17/10; G06T 17/005
(Continued)

(56) References Cited

U.S. PATENT DOCUMENTS 4,926,344 A * 5/1990 Collins .................. A41H 3/007
700/132
6,546,309 B1 4/2003 Gazzuolo
(Continued)

FOREIGN PATENT DOCUMENTS

EP 3234925 A1 10/2017
GB 2488237 A 8/2012
(Continued)

OTHER PUBLICATIONS

Abdulla, "Mask R-CNN for Object Detection and Segmentation," GitHub repository, accessed from https://github.com/matterport/Mask_RCNN , 2017, 15 pp. (Applicant points out, in accordance with MPEP 609.04(a), that the year of publication, 2017, is sufficiently earlier than the effective U.S. filing date, so that the particular month of publication is not in issue.)
(Continued)

*Primary Examiner* — Gordon G Liu
(74) *Attorney, Agent, or Firm* — Shumaker & Sieffert, P.A.

(57) ABSTRACT

A device can be configured to store, in a memory device, a plurality of meshes; obtain, by processing circuitry, an image of an apparel; analyze, by processing the circuitry, the image to determine parameters of the apparel; select, by processing the circuitry, a mesh from the plurality of meshes based on the parameters of the apparel; generate, by processing the circuitry, a swatch based on the image; apply, by processing the circuitry, the swatch to the mesh to generate a virtual apparel; and output, to a display device, graphical information based on the virtual apparel.

14 Claims, 7 Drawing Sheets

(51) Int. Cl.
*G06F 16/54* (2019.01)
*G06K 9/00* (2006.01)
*G06T 15/00* (2011.01)
*G06T 15/04* (2011.01)
*G06T 13/40* (2011.01)
*G06T 17/20* (2006.01)
*G06Q 30/06* (2012.01)
*G06T 17/10* (2006.01)
*G06F 30/20* (2020.01)

(52) U.S. Cl.
CPC ..... *G06K 9/00275* (2013.01); *G06K 9/00281* (2013.01); *G06Q 30/0627* (2013.01); *G06T 13/40* (2013.01); *G06T 15/005* (2013.01); *G06T 15/04* (2013.01); *G06T 17/10* (2013.01); *G06T 17/20* (2013.01); *G06T 2210/16* (2013.01)

(58) Field of Classification Search
USPC .......................................................... 345/420
See application file for complete search history.

(56) References Cited

U.S. PATENT DOCUMENTS

| | | | |
|---|---|---|---|
| 2002/0021297 | A1 | 2/2002 | Weaver |
| 2009/0132371 | A1 | 5/2009 | Strietzel et al. |
| 2010/0030578 | A1 | 2/2010 | Siddique et al. |
| 2010/0050088 | A1 | 2/2010 | Neustaedter et al. |
| 2011/0298897 | A1* | 12/2011 | Sareen .................. G06N 3/006 348/47 |
| 2013/0325493 | A1 | 12/2013 | Wong et al. |
| 2014/0160122 | A1 | 6/2014 | Chou |
| 2015/0042663 | A1 | 2/2015 | Mandel et al. |
| 2016/0088284 | A1 | 3/2016 | Sareen et al. |
| 2017/0161948 | A1* | 6/2017 | Hua ..................... G06T 17/205 |
| 2019/0035133 | A1 | 1/2019 | Jiao et al. |
| 2019/0035149 | A1 | 1/2019 | Chen et al. |

FOREIGN PATENT DOCUMENTS

| | | |
|---|---|---|
| JP | 2002024319 A | 1/2002 |
| WO | 2016138481 A1 | 9/2016 |

OTHER PUBLICATIONS

Chang et al., "Palette-based Photo Recoloring," ACM Transactions on Graphics (Proceedings of SIGGRAPH), vol. 34, No. 4, Jul. 2015, 11 pp.
He et al., "Mask R-CNN," IEEE International Conference on Computer Vision (ICCV), ArXiv, Jan. 2018, 12 pp.
Long et al., "Fully Convolutional Networks for Semantic Segmentation," IEEE International Conference on Computer Vision and Pattern Recognition (CVPR), Mar. 2015, 10 pp.
YouTube, "Avataar.Me—Decoded Future: Talk on AR for Fashion," retrieved from https://www.youtube.com/watch?v=uq3PlpBisi4&feature=youtu.be, uploaded on Jul. 5, 2018 by user Avataar Me, 1 pp.
U.S. Appl. No. 16/204,883, filed Nov. 29, 2018, naming inventors Aluru et al.
U.S. Appl. No. 16/204,934, filed Nov. 29, 2018, naming inventors Aluru et al.
Non-Final Office Action from U.S. Appl. No. 16/204,883 dated Dec. 26, 2019 (17 pp).
Response to Non-Final Office Action from U.S. Appl. No. 16/204,883 dated Dec. 26, 2019 which was filed Mar. 26, 2020 (11 pp).
Notice of Allowance from U.S. Appl. No. 16/204,883 dated Apr. 16, 2020 (8 pp).
Non-Final Office Action from U.S. Appl. No. 16/204,934 dated Jan. 30, 2020 (33 pp).
Response to Non-Final Office Action from U.S. Appl. No. 16/204,934 dated Jan. 30, 2020 which was filed Apr. 30, 2020 (9 pp).
Interview Summary from U.S. Appl. No. 16/204,934 dated Apr. 27, 2020 (3 pp).
International Search Report and Written Opinion of International Application No. PCT/IN2019/050143, dated Jun. 20, 2019, 11 pp.
Yuan et al., "A Mixed Reality Virtual Clothes Try-On System," IEEE Transaction on Multimedia, vol. 16, No. 1, Jan. 2014, 11 pp.

* cited by examiner

VIRTUAL REPRESENTATION CREATION OF USER FOR FIT AND STYLE OF APPAREL AND ACCESSORIES

This application claims the benefit of U.S. Provisional Application No. 62/636,157, filed Feb. 27, 2018, the entire contents of which is incorporate herein by reference.

TECHNICAL FIELD

The disclosure relates to computerized virtual representation creation.

BACKGROUND

Online retail and e-commerce are increasingly taking market share from on-premise traditional brick and mortar retailers. When shopping at brick and mortar retailers, a customer can try on apparel and accessories to ensure the right fit and style. When shopping online, a customer is limited in his or her ability to ensure the right fit and style due to the inability to try on the apparel and accessories.

SUMMARY

In general, the disclosure describes example techniques of real-time rendering of virtual representations of a user, e.g., so-called avatars, that can be displayed on a personal computing device. As described in more detail, processing circuitry of one or more network computing devices can generate a virtual apparel and present the avatar wearing the apparel.

According to another example, a method of virtual representation creation includes storing, in a memory device, a plurality of meshes; obtaining, by processing circuitry, an image of an apparel; analyzing, by processing the circuitry, the image to determine parameters of the apparel; selecting, by processing the circuitry, a mesh from the plurality of meshes based on the parameters of the apparel; generating, by processing the circuitry, a swatch based on the image; applying, by processing the circuitry, the swatch to the mesh to generate a virtual apparel; and outputting, to a display device, graphical information based on the virtual apparel.

According to another example, a computer-readable storage medium storing instructions that when executed cause processing circuitry to store a plurality of meshes; obtain an image of an apparel; analyze the image to determine parameters of the apparel; select a mesh from the plurality of meshes based on the parameters of the apparel; generate a swatch based on the image; apply the swatch to the mesh to generate a virtual apparel; and output graphical information based on the virtual apparel.

According to another example, a device includes a memory configured to store a plurality of meshes and processing circuitry configured to obtain an image of an apparel; analyze the image to determine parameters of the apparel; select a mesh from the plurality of meshes based on the parameters of the apparel; generate a swatch based on the image; apply the swatch to the mesh to generate a virtual apparel; and cause a display device to display graphical information based on the virtual apparel.

According to another example, a device for presenting a virtual representation creation includes means for storing a plurality of meshes; means for obtaining an image of an apparel; means for analyzing the image to determine parameters of the apparel; means for selecting a mesh from the plurality of meshes based on the parameters of the apparel; means for generating a swatch based on the image; means for applying the swatch to the mesh to generate a virtual apparel; and means for outputting, to a display device, graphical information based on the virtual apparel.

The details of one or more examples are set forth in the accompanying drawings and the description below. Other features, objects, and advantages will be apparent from the description and drawings, and from the claims.

DETAILED DESCRIPTION

Figure 1:
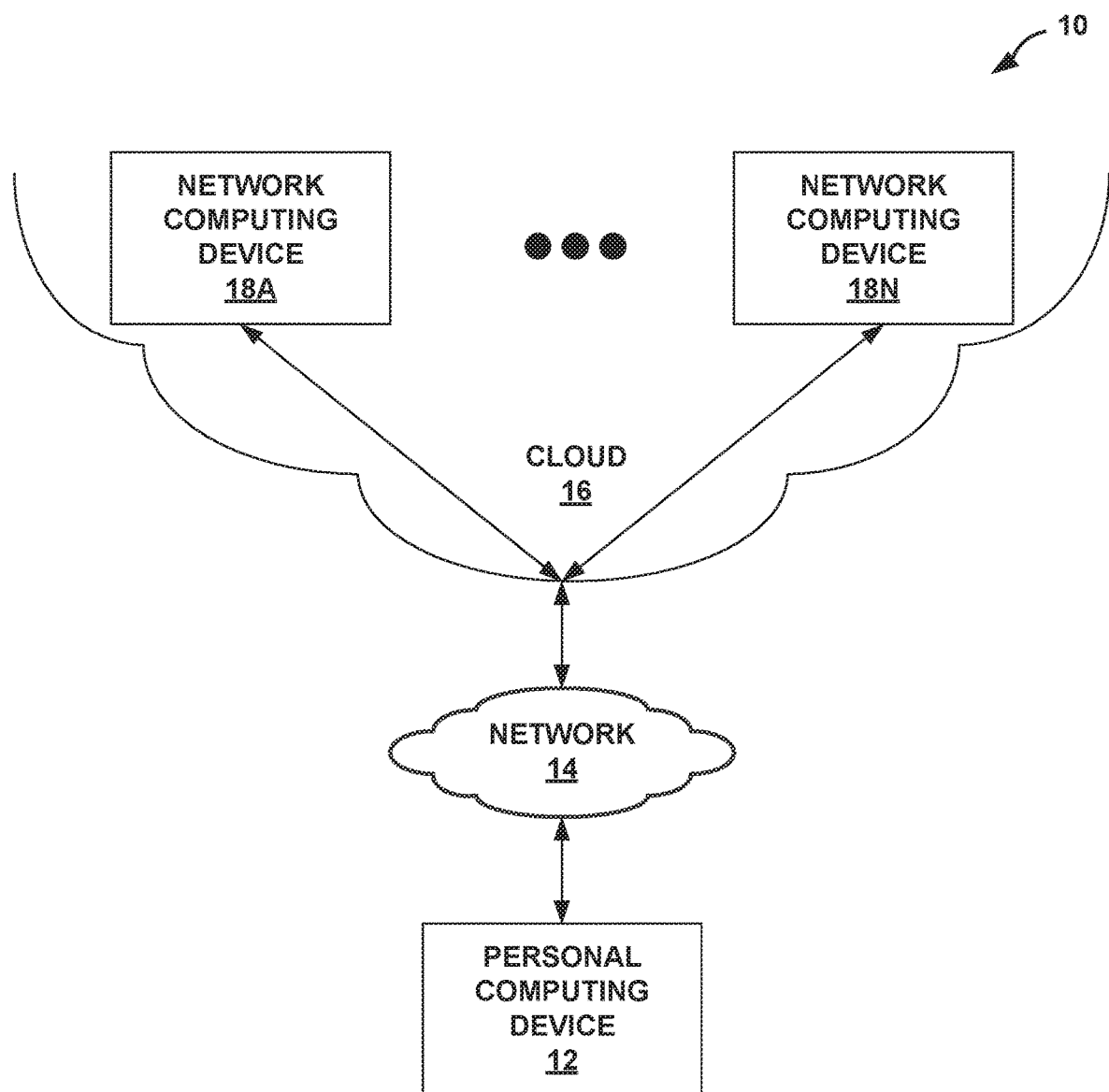
FIG. 1 is a block diagram illustrating a system for creating virtual representations of users in accordance with one or more example techniques described in this disclosure.

Online retail and e-commerce are increasingly taking market share from on premise traditional brick and mortar retailers. However, the online shopping experience, especially in fashion—apparels, accessories, beauty and personal care—has drawbacks compared to an experience in a physical store. In some cases, consumers discover and purchase fashion products online by evaluating static two-dimensional (2D) images of the fashion products on brand ambassadors or models. There is no ability for the customers to try before they buy as in a physical store and nor is the shopping experience personalized to the consumer.

There are some online virtual try-on experiences, but the options are limited. Virtual try-on means a user viewing how a virtual representation of an apparel or accessory would look when worn by the user. Some virtual try-on experiences are not personalized, and the virtualized accessories and apparel cannot be displayed together. These techniques are not well suited for real-time rendering on personal computing devices, such as mobile devices (e.g., smart phones or tablets) or laptops, on which many users view and purchase apparel and accessories.

This disclosure describes example techniques to generate a virtual representation of a user in real-time, as well as virtual representations of apparel and accessories in real-time, so that the user can determine the fit and style of the apparel and accessories. For example, a user may view how the apparel and accessories appear together on his or her body, as opposed to seeing the apparel and accessories separately on bodies that may not accurately reflect the user's body.

As described in more detail below, a user may take a picture of himself or herself (e.g., a "selfie"), and upload the picture to one or more network computing devices (e.g., one or more servers located in a cloud-computing infrastructure coupled to the personal computing device of the user via the Internet). In cloud-computing, operations to be performed in the cloud may be divided or shared across one or more network computing devices. Hence, in this disclosure operations described with respect to a network computing device should be understood to also encompass examples where the operations are shared or divided across multiple network computing devices.

The network computing device may determine facial features in the image. For example, the network computing device may determine key points on the user's face (e.g., locations of cheek bones, nose, eyes, mouth, etc.) and determine relative distances between the key points to determine the facial features. Based on the relative distance, the network computing device may determine deformations to apply to a default deformable 3D face, also called a virtual head representation. The virtual head representation may be a mesh of primitives arranged to appear like a human head. The virtual head representation is "deformable" in the sense that the vertices of the primitives in the mesh can be rearranged to form different head and face shapes.

In some examples, there may be a plurality of virtual head representations. The network computing device may utilize the facial features to select one of the plurality of virtual head representations to deform. As one example, the plurality of virtual head representations may be clustered together based on common features (e.g., virtual head representations having the same eye separation form one cluster, virtual head representations having the same nose to lips distance form one cluster, etc.). Based on the facial features, the network computing device may determine a cluster from the plurality of clusters for the virtual head representations. The network computing device may then select one of the virtual head representations from the determined cluster that most closely matches the head of the user.

In addition, the user may provide body type information (e.g., bust size, waist size, shoulder width, etc.). In some examples, rather than manually entering body type information, the user may upload an image of the his or her body from which the network computing device determines the body type information. Based on the body type information, the network computing device may select a body type from a plurality of body types. The network computing device may render the deformed virtual head representation with the selected body type to create a virtual representation of the user and output graphical information of the virtual representation to the personal computing device of the user for the user to view.

As described in more detail below, a user may also identify a picture or pictures of a piece of apparel and transmit the picture to the one or more network computing devices. The network computing devices store a plurality of meshes and select a mesh from the plurality of meshes based on an analysis of the picture. A mesh generally refers to a virtual 3D structure defined, for example, by a set of data points (e.g., a point cloud) in a virtual 3D space. The network computing devices generate swatches based on the picture and apply the swatches to the mesh to generate a virtual apparel. The swatch may, for example, be a texture image that correspond to a portion of the apparel, such that the virtual apparel is composed of a plurality of swatches. The portion of the apparel may, for example, be defined by a sub group of point clouds. With a virtual representation of the user and a virtual apparel, the network computing device may be able to render the virtual apparel over the virtual representation to give the user a real-life showing of how the apparel will appear on the user.

3D inventories of apparels are generally divided into two components, point clouds (which hold the 3D structure information of the apparels) and the textures. The point clouds define meshes, with a mesh typically varying in size from from 500 KB to 5 MB. A mesh includes the 3D points and connecting edges between those points for defining the 3D structure. A mesh also includes a material file which holds the material properties of the mesh and texture link information for mapping the texture files to the mesh components to generate a final output of a 3D virtual apparel.

By storing a plurality of meshes and selecting a mesh from the plurality of meshes based on an analysis of the picture and by distributing the creation of the virtual apparel across personal computing devices and network computing devices, the example techniques described in this disclosure may provide the technical advantage of reducing computations, relative to other techniques, to ensure real-time virtual apparel creation such that the user can have interactive, real-time user experience.

FIG. 1 is a block diagram illustrating a system 10 for creating virtual representations of users in accordance with one or more example techniques described in this disclosure. As illustrated, system 10 includes personal computing device 12, network 14, and cloud 16. Cloud 16 includes network computing devices 18A-18N (collectively referred to as "network computing devices 18").

Examples of personal computing device 12 include mobile computing devices (e.g., tablets or smartphones), laptop or desktop computers, e-book readers, digital cameras, video gaming devices, and the like. In one or more examples, a user of personal computing device 12 may shop for apparel and accessories online. For example, the user may access online retailers and shift through their items to identify apparel or accessories to purchase. In some examples, the user of personal computing device 12 may be scrolling through content from various websites, and some apparel or accessories may pique his or her interest.

The user may be interested in determining whether to purchase the item or not but may not have access to a retailer where he or she can try on the item for fit and style. In some cases, even where retailer access is available, the user may desire to make more of an on-the-spot determination of whether the item will look good when worn. Moreover, the user may wish to ask friends and family of their opinion and taking everyone to the retailer may not be practical.

In the example techniques described in this disclosure, the user may create a virtual representation of himself or herself via personal computing device 12. The user may use the virtual representation to virtually try-on apparels and accessories to determine whether the style and fit is one he or she would want. The user may also be able to share (e.g., via social media or some other form) the virtual representation with the virtual apparels and accessories with friends and family to solicit opinions.

For determining the style and fit of the apparel and accessories, it may be possible that the user will cycle through many options or try many different combinations. To ensure high quality interaction, the user may desire that the virtual representation is created relatively quickly (e.g., in run-time). As described in more detail, this disclosure describes techniques to create such virtual representations in run-time allowing for the user to quickly view the apparel and accessories.

To create the virtual representation, the user may take an image of himself or herself (e.g., a selfie). The image may include the face of the user and can include other body parts as well. In some examples, rather than taking the image, the user may retrieve a previously stored image. For example, the user may either take a picture using his or her camera or use an already existing picture which has a frontal snapshot of the user's face. This can either be a 2D image, taken from a regular camera on mobile, desktop, etc., or a 3D depth image, taken from a 3D depth sensing camera.

The user may upload the image to one or more network computing devices 18 for further processing. In addition, the user may upload body type information or upload images that show the body to one or more network computing devices 18 for further processing. One or more network computing devices 18 may generate a virtual representation of the user based on the image and the body type information. For example, network computing devices 18 may provide responsive real-time cloud services that can, on a responsive real-time basis, generate custom 3D virtual representations (e.g., avatars) using a 2D frontal face selfie or using a 3D depth camera image of the frontal face along with a few body measurements or full body pictures which can be used to programmatically approximate user body measurements provided by the user.

As illustrated, network computing devices 18 are within cloud 16. Cloud 16 represents a cloud infrastructure that supports multiple network computing devices 18 on which applications or operations requested by one or more users run. For example, cloud 16 provides cloud computing for using network computing devices 18, hosted on network 14, to store, manage, and process data, rather than at personal computing device 12.

Network 14 may transport data between network computing devices 18 of cloud 16 and personal computing device 12. For example, network 14 may form part a packet-based network, such as a local area network, a wide-area network, or a global network such as the Internet. Network 14 may include routers, switches, base stations, or any other equipment that may be useful to facilitate data between personal computing device 12 and network computing devices 18.

Examples of network computing devices 18 include server devices that provide functionality to personal computing device 12. For example, network computing devices 18, in cloud 16, may share data or resources for performing computations for personal computing device 12. As one example, network computing devices 18 may be computing servers, but the example techniques are not so limited. Network computing devices 18 may be a combination of computing servers, web servers, database servers, and the like.

For example, network computing devices 18 may host an application, executing on processing circuitry, via which network computing devices 18 receive the image uploaded by the user and the body type information (e.g., as images or user input). The processing circuitry encompasses the processing circuitry of one or more of network computing devices 18 that together perform the example techniques described in this disclosure. The processing circuitry of network computing devices 18 may determine key features on the face of the user from the image and determine 3D facial shape contours to estimate the face shape and contour of the user.

In addition to the determining a facial estimate, the processing circuitry may be configured to select a body type of the user based on the user provided body type information. Examples of the body type information include height, waist, bust, hip, and/or weight measurements, and/or visual body type selection such as apple, pear, rectangle, etc. These measurements may be adequate from a fit perspective for standard machine-manufactured apparel as the apparel is designed on similar body types. There may be more or fewer examples of body type information that the user provides, and the examples are not limited to the above examples.

In some examples, the processing circuitry may deduce the body type information from full body pictures provided by the user. This may help avoid the user from having to enter measurements. However, as users are likely to wear different sizes of apparels in different pictures (e.g., some loose; some tight fitting), the user may need to provide multiple pictures for the processing circuitry to determine an accurate estimation of user body measurements.

The processing circuitry may use the body type information to select a body type that is the best fit for the user. For example, network computing devices 18 may store information for a plurality of body types (e.g., different shapes and sizes of bodies). The body types that network computing devices store may be virtualized body types. Based on the body type information, the processing circuitry may determine which of the plurality of body types is the closest match.

For example, the processing circuitry may determine the nearest virtual body type match of the body measurements from a database of pre-modelled 3D body avatars without face or neck (e.g., a database of a plurality of virtualized body types). The processing circuitry may match the measurements and anthropometric ratios provided by the user vis-à-vis the measurements and anthropometric ratios of the virtualized body types. By separating out the forming of the face portion of the user from the body creation, the processing circuitry may be configured to generate the graphical representation more quickly than some other techniques to achieve the real-time rendering of the graphical representation.

In one or more examples, the plurality of pre-generated and stored virtualized body types may be pre-generated such that the top of the body types substantially aligns (e.g., such that there is minimal distortion) with the neck seam of the frontal contour before any deformations. To ensure that the alignment between the neck seam of the frontal contour and the top of the plurality of body types persists after deformation of the head portion of the frontal contour, the processing circuitry of one or more network computing devices 18 may not (e.g., may avoid) deforming the neck seam of the frontal contour. Again, the neck seam is at the base of the neck and stops near the beginning of the clavicle. However, the neck seam may include more or less anatomical portions of the body.

By avoiding the deformation of the neck seam, the processing circuitry may ensure that prior to and post deformation of the head portion of the frontal contour, the deformed frontal contour will still substantially align with the selected body type. As the processing circuitry moves up the neck seam along the neck portion of the frontal contour, the processing circuitry may apply deformation to the neck portion of the frontal contour.

With the deformed frontal contour and the selected body type, the processing circuitry of network computing devices 18 may render the deformed frontal contour with the selected body type by aligning the body type with the neck seam of the deformed frontal contour to create the virtual representation of the user. For example, the processing circuitry may determine the vertices of the primitives that form the neck seam on the deformed frontal contour and blend those vertices of the primitives that form the top of the body type to form a unitary structure that is the virtual representation of the user. The processing circuitry may then output graphical information based on the virtual representation of the user to personal computing device 12. Personal computing device 12 may then display the virtual representation of the user.

In some examples, the user, via personal computing device 12, may have selected a virtual apparel that he or she wants to try, and the processing circuitry of network computing devices 18 may render the virtual apparel on top of the virtual representation of the user so that the user can see the style and fit of the apparel. In some examples, personal computing device 12 may be configured to separately receive the virtual representation and the virtual apparel, and personal computing device 12 may render the virtual apparel on the virtual representation.

The processing circuitry of network computing devices 18 can be configured to create 3D apparels from 2D images based on image recognition techniques. The 2D images of the apparels may, for example, be identified by the user via personal computing device 12. Once the user provides the 2D images for the apparel, the processing circuitry of network computing devices 18 may extract information, such as pattern and style level information, and generate meta-tags, using image analysis techniques. The meta-tags may for example store information for categories such as a lower body length, a neckline, a produce color, a product pattern, a skirt shape, a sleeve length, a sleeve style, or other such categories. Each category may have an associated confidence score (e.g., between 0 and 1) indicating a confidence value for the category. The confidence value may be based on machine learning that determines accuracy of the image analysis techniques.

Based on the information in the meta-tags, the processing circuitry of network computing devices 18 associates the apparel with an existing mesh (e.g., a CAD/CAM file) in a database that has stored stitching information for a plurality of meshes. The processing circuitry of network computing devices 18 may then further extract color and print information for various parts of the apparel and prepare those for application onto the identified mesh, e.g., the identified CAD/CAM file. The processing circuitry of network computing devices 18 creates the 3D mesh for the apparel using the existing mesh along with the extracted information out of the 2D images.

The processing circuitry of network computing devices 18 may additionally create one or more textures and apply the textures to the 3D apparel meshes based on image recognition techniques applied to the 2D images provided by the user. A texture may, for example, be a pictorial representation of the cloth used to stitch the apparel. For some apparels, for example a shirt that has a different color or different pattern on the sleeves than on the body, network computing devices 18 may generate more than textures for the 3D apparel mesh. This particular type of texture may be referred to as a recolor texture. Textures may also be used for conveying properties of materials, such as the difference between wool and cotton. A bump-map texture, for example, may be used to give a virtual apparel a feel of a particular cloth type. Other types of textures include specular maps for making the apparel have a certain shininess or highlight and ambient maps for making the apparel have a desired shading or occlusion.

One swatch may have a recolor texture, a bump-map texture, a specular map, etc. all overlaid. Every swatch may must have a recolor texture while the other maps are optional (depending on the property of the swatch). All the maps for a single swatch may be different. The same map (for example a bump map) might be mapped to multiple swatches.

The processing circuitry of network computing devices 18 may identify a texture of an apparel from the 2D image provided and then apply that texture, in the form of color and print for instance, to swatches on the 3D meshes in real-time. When apparel is constructed virtually, the texture swatches are currently created using photo editing tools. The techniques of this disclosure, however, include techniques for creating apparel texture swatches based on image recognition techniques from the 2D image in an automated manner, which may enable the efficient creation of texture swatches and enable easy replication of similar styles of swatches in a scalable manner.

Personal computing device 12 receives a 3D representation of a full stitched garment from the processing circuitry of network computing devices 18. In the 3D representation, all the sub meshes are merged to create the entire apparel. The backend simulation performed by the processing circuitry of network computing devices 18 reads the stitching information which corresponds to the actual stitching that happens during production of the apparel and simulates the garment accordingly. The processing circuitry of network computing devices 18 creates separate material information for each component of the garment. That information is passed to personal computing device 12 through the material file, and each of those materials are assigned to a particular texture. Personal computing device 12 reads the material information from the material file and recolors the textures accordingly to create the new garment from the user image. Material files are created on personal computing device 12 while creating the data file before uploading which helps the renderer to display better details for the SKUs, which helps to ensure the fashion details are present in the renderer.

Personal computing device 12 may render, in real-time, the 3D apparels on the virtual representations of the user, i.e., on customized avatars. This is a process that is not presently available to online fashion consumers. The techniques of this disclosure can bring this functionality to a user in a manner that is highly responsive and completely, or nearly completely, automated.

In addition to apparel, the user may be also be able to select different accessories (e.g., hairstyles, earrings, sunglasses, etc.) and cosmetics (e.g., lipsticks, eye liners, etc.). For example, one a user creates his or her own virtual representation, the user can request to visualize a 3D accessory or cosmetics on the virtual representation. Given the user requests this in real-time basis, the processing circuitry of network computing devices 18 may need to deliver a virtual 3D model for the accessories and cosmetic products in real-time basis.

Moreover, the virtual 3D model of the accessories and cosmetic products can be sized and shaped to properly fit the virtual representation. In one or more examples, network computing devices 18 store the virtual 3D model of the accessories and the cosmetic products as they would appear on the frontal contour, prior to any deformation. The processing circuitry may store information indicative of the deformation applied to the frontal contour. The processing circuitry may determine the deformation to apply to the virtual 3D model of the accessories and cosmetic products based on the information indicative of the deformation applied to the frontal contour so that the virtual 3D model of the accessories and cosmetic products scale with the deformations applied to the frontal contour and the virtual 3D model of the accessories and cosmetic products aligns properly on the virtual representation of the user.

Figure 2:
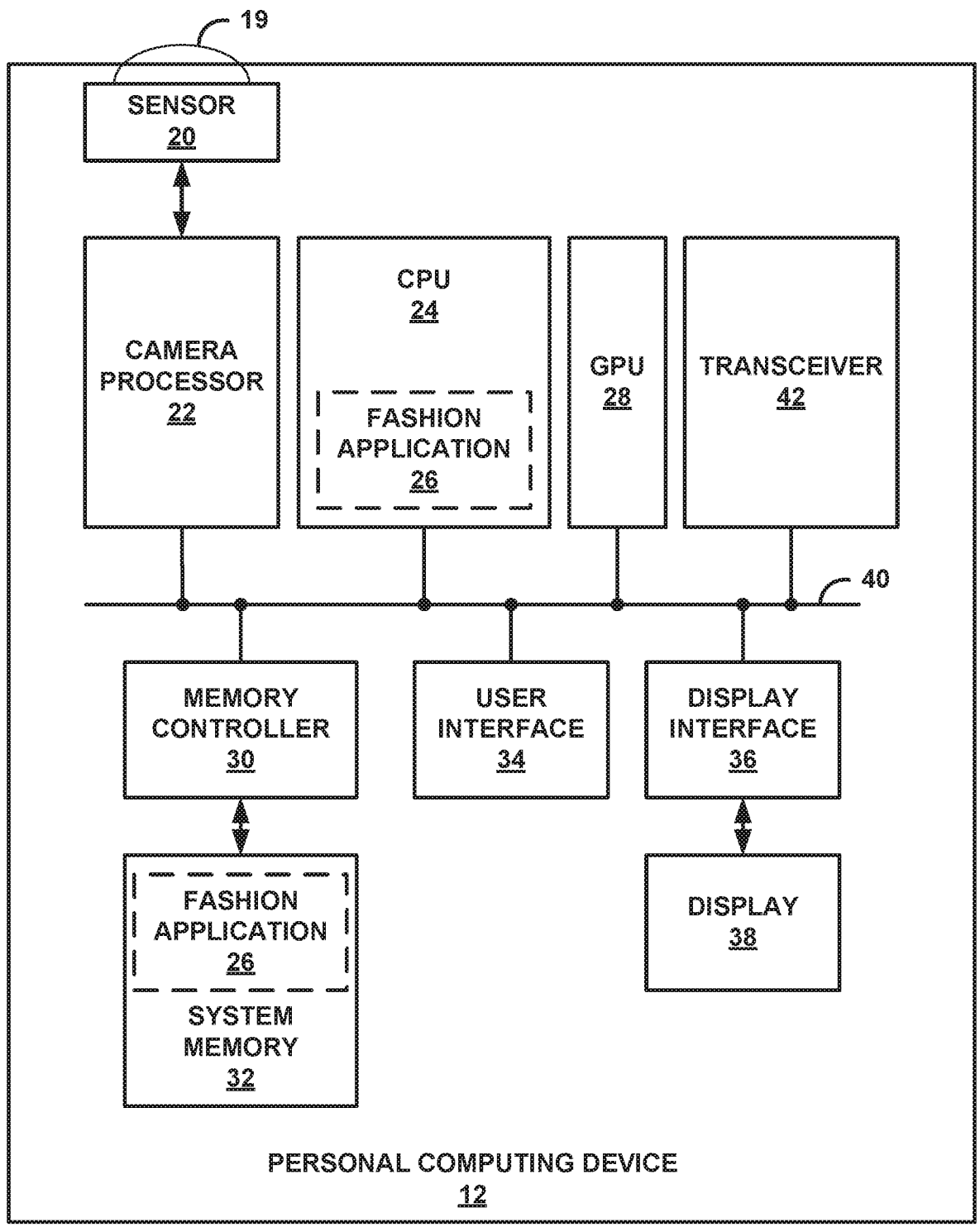
FIG. 2 is a block diagram illustrating an example of a personal computing device configured to display virtual representations of users in accordance with one or more example techniques described in this disclosure.

FIG. 2 is a block diagram illustrating an example of a personal computing device configured to display virtual representations of users in accordance with one or more example techniques described in this disclosure. Examples of personal computing device 12 include a computer (e.g., personal computer, a desktop computer, or a laptop computer), a mobile device such as a tablet computer, a wireless communication device (such as, e.g., a mobile telephone, a cellular telephone, a satellite telephone, and/or a mobile telephone handset), a landline telephone, an Internet telephone, a handheld device such as a portable video game device or a personal digital assistant (PDA). Additional examples of person computing device 12 include a personal music player, a video player, a display device, a camera, a television, or any other type of device that processes and/or displays graphical data.

As illustrated in the example of FIG. 2, personal computing device 12 includes first lens 20, camera processor 22, a central processing unit (CPU) 24, a graphical processing unit (GPU) 28, memory controller 30 that provides access to system memory 32, user interface 34, and display interface 36 that outputs signals that cause graphical data to be displayed on display 38. Personal computing device 12 also includes transceiver 42, which may include wired or wireless communication links, to communicate with network 14 of FIG. 1. Although FIG. 2 illustrates lens 20 as part of the same device that includes GPU 28, the techniques described in this disclosure are not so limited.

Also, although the various components are illustrated as separate components, in some examples the components may be combined to form a system on chip (SoC). As an example, camera processor 22, CPU 24, GPU 28, and display interface 36 may be formed on a common integrated circuit (IC) chip. In some examples, one or more of camera processor 22, CPU 24, GPU 28, and display interface 36 may be in separate IC chips. Various other permutations and combinations are possible, and the techniques should not be considered limited to the example illustrated in FIG. 2. The various components illustrated in FIG. 2 (whether formed on one device or different devices) may be formed as at least one of fixed-function or programmable circuitry such as in one or more microprocessors, application specific integrated circuits (ASICs), field programmable gate arrays (FPGAs), digital signal processors (DSPs), or other equivalent integrated or discrete logic circuitry.

The various units illustrated in FIG. 2 communicate with each other using bus 40. Bus 40 may be any of a variety of bus structures, such as a third generation bus (e.g., a HyperTransport bus or an InfiniBand bus), a second generation bus (e.g., an Advanced Graphics Port bus, a Peripheral Component Interconnect (PCI) Express bus, or an Advanced eXtensible Interface (AXI) bus) or another type of bus or device interconnect. It should be noted that the specific configuration of buses and communication interfaces between the different components shown in FIG. 2 is merely exemplary, and other configurations of computing devices and/or other image processing systems with the same or different components may be used to implement the techniques of this disclosure.

Camera processor 22 is configured to receive the electrical currents as sensor signals from respective pixels of sensor 20 and process the electrical currents to generate pixel data of images. In some examples, camera processor 14 may be configured as a single-input-multiple-data (SIMD) architecture. Camera processor 14 may perform the same operations on current received from each of the pixels on sensor 20. Each lane of the SIMD architecture may include an image pipeline. The image pipeline includes hardwire circuitry and/or programmable circuitry (e.g., at least one of fixed-function or programmable circuitry) to process the output of the pixels.

Camera processor 22 outputs the resulting images (e.g., pixel values for each of the image pixels) to system memory 32 via memory controller 30. As described in more detail, in response to a user executing fashion application 26, personal computing device 12 may upload the image to one or more network devices 18 for creating virtual representations of the user.

CPU 24 may be a general-purpose or a special-purpose processor that controls operation of personal computing device 12. A user may provide input to personal computing device 12 to cause CPU 24 to execute one or more software applications. The software applications that execute on CPU 24 may include, for example, fashion application 26, as described in more detail. The user may provide input to personal computing device 12 via one or more input devices (not shown) such as a keyboard, a mouse, a microphone, a touch pad or another input device that is coupled to personal computing device 12 via user interface 34. In some examples, such as where personal computing device 12 is a mobile device (e.g., smartphone or tablet), user interface 34 may be part of display 38.

Display 38 may include a monitor, a television, a projection device, a liquid crystal display (LCD), a plasma display panel, a light emitting diode (LED) array, electronic paper, a surface-conduction electron-emitted display (SED), a laser television display, a nanocrystal display or another type of display unit. Display 38 may be integrated within personal computing device 12. For instance, display 38 may be a screen of a mobile telephone handset or a tablet computer. Alternatively, display 38 may be a stand-alone device coupled to personal computing device 12 via a wired or wireless communications link. For instance, display 38 may be a computer monitor or flat panel display connected to a personal computer via a cable or wireless link.

Camera processor 22, CPU 24, and GPU 28 may store image data, and the like in respective buffers that are allocated within system memory 32. Display interface 36 may retrieve the data from system memory 32 and configure display 38 to display the image represented by the generated image data. In some examples, display interface 36 may include a digital-to-analog converter (DAC) that is configured to convert the digital values retrieved from system memory 32 into an analog signal consumable by display 38. In other examples, display interface 36 may pass the digital values directly to display 38 for processing.

For ease of description, one or more examples are described with user interface 34 being part of display 38 (e.g., where display 38 is a touchscreen). However, the example techniques should not be considered limited to such examples.

Memory controller 30 facilitates the transfer of data going into and out of system memory 32. For example, memory controller 30 may receive memory read and write commands, and service such commands with respect to memory 32 in order to provide memory services for the components in personal computing device 12. Memory controller 30 is communicatively coupled to system memory 32. Although memory controller 30 is illustrated in the example of personal computing device 12 of FIG. 2 as being a processing circuit that is separate from both CPU 28 and system memory 32, in other examples, some or all of the functionality of memory controller 30 may be implemented on one or both of CPU 24 and system memory 32.

System memory 32 may store program modules and/or instructions and/or data that are accessible by camera processor 22, CPU 24, and GPU 28. For example, system memory 32 may store user applications (e.g., fashion application 26), resulting images from camera processor 22, rendered image content from GPU 28, etc. System memory 32 may additionally store information for use by and/or generated by other components of personal computing device 12. System memory 32 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), flash memory, a magnetic data media or an optical storage media.

In some aspects, system memory 32 may include instructions that cause camera processor 22, CPU 24, GPU 28, and display interface 36 to perform the functions ascribed to these components in this disclosure. Accordingly, system memory 32 may be a computer-readable storage medium having instructions stored thereon that, when executed, cause one or more processors (e.g., camera processor 22, CPU 24, GPU 28, and display interface 36) to perform various functions.

In some examples, system memory 32 is a non-transitory storage medium. The term "non-transitory" indicates that the storage medium is not embodied in a carrier wave or a propagated signal. However, the term "non-transitory" should not be interpreted to mean that system memory 32 is non-movable or that its contents are static. As one example, system memory 32 may be removed from personal computing device 12, and moved to another device. As another example, memory, substantially similar to system memory 32, may be inserted into personal computing device 12. In certain examples, a non-transitory storage medium may store data that can, over time, change (e.g., in RAM).

As illustrated, one example of the software application that CPU 24 executes is fashion application 26. The user may see a thumbnail indication of fashion application 26 on display 38, and when the user wants to interact with fashion application 26 (e.g., such as when the user wants to determine fit and style of apparel or accessories), the user touches the thumbnail to execute fashion application 26 on CPU 24.

In response to executing fashion application 26, the user may be prompted, via display 38, to take an image of himself or herself (e.g., a selfie). The user may then take the selfie, ensuring that his or her face is visible. For instance, in response to interacting with the prompts provided on display 38, lens 19, and sensor 20 captures a selfie of the user that camera processor 22 process and display 38 displays within the graphical interface generated by the execution of fashion application 26. Rather than or in addition to taking a selfie, display 38, responsive to the execution of fashion application 26, may instruct the user to retrieve a pre-stored selfie from system memory 32.

In some examples, display 28, responsive to the execution of fashion application 26, may prompt the user to input body type information such as one or more of waist, height, bust, body shape, and the like. The waist, height, bust, and body shape are examples of body type parameters, and there may be additional examples of body type parameters. In some examples, in addition to or instead of inputting body type information, the user may take additional selfies that capture the full body of the user, from which body type information may be determined.

CPU 24, via execution of fashion application 26, may cause transceiver 42 to output the image (e.g., selfie image) and the user inputted body type information and/or the body image to one or more network computing devices 18 for network computing devices 18 to create a virtual representation of the user, in accordance with one or more example techniques described in this disclosure. In addition, fashion application 26 may allow the user to select, via display 38, apparels and accessories that the user may want to virtually try-on to see the style and fit. CPU 24, via execution of fashion application 26, may cause transceiver 42 to also output information of the apparels and accessories.

One or more network computing devices 18 may create the virtual representation of the user using the example techniques described in this disclosure and output graphical information of the virtual representation to personal computing device 12. As one example, network computing devices 18 may generate a series of commands and data (e.g., vertices and color information) for how GPU 28 is to render the virtual representation, and output the commands and data, which are examples of the graphical information, to personal computing device 12.

In some examples, the commands may conform to a graphics application programming interface (API), such as, e.g., an Open Graphics Library (OpenGL®) API, OpenGL® 3.3, an Open Graphics Library Embedded Systems (OpenGL ES) API, an OpenCL API, a Direct3D API, an X3D API, a RenderMan API, a WebGL API, or any other public or proprietary standard graphics API. The techniques should not be considered limited to requiring a particular API.

GPU 28 receives (e.g., directly from transceiver 42 or from CPU 24) the commands and data generated by network computing devices 18. In response, GPU 28 performs the operations defined by the commands on the received data to render the virtual representation of the user, possibly with the virtual apparel and accessories visible to the user. GPU 28 stores the graphical data as the result of the rendering in system memory 32, and display interface 36 retrieves the graphical data for display on display 38.

In some examples, the user requests movement or some form of animation of the virtual representation from the interface provided by fashion application 26. In response, CPU 24, via fashion application 26, may request network computing devices 18 to render frames having the different movement (e.g., generate frames at 30 frames-per-second (fps)), and display 38 may display the frames at the frame rate to show smooth movement. In some examples, GPU 28 renders frames at 30 fps to animate the movement and cause display 38 to display the animation.

Moreover, display 38, via execution of fashion application 26, displays options for the user to request new apparel or accessories. In response, CPU 24, via execution of fashion application 26, causes transceiver 42 to output information of the requested apparel or accessories. Transceiver 42 receives graphical information for the newly requested apparel or accessories, and GPU 28 renders the virtual representation with the newly requested apparel or accessories.

In this way, the example techniques describe for an immersive experience for the user to determine the style and fit of an apparel or accessory without needing to physically try it on. As described, the user may desire to view the apparel and accessory on the virtual representation in run-time (e.g., real-time), so that the user can quickly determine whether to try on different apparel or accessories. Accordingly, network computing devices 18 may be configured to generate the graphical information in run-time so that personal computing device 12 can display the virtual representation and apparel and accessories in run-time.

For example, via the execution of fashion application, the user may be able to perform various tasks to determine the style and fit. Accordingly, this disclosure describes techniques to provide consumers an immersive end to end personalized 3D experience for fashion discovery and commerce on mobile. The immersive personalized 3D experience may start with the consumer or user creating a realistic 3D avatar of themselves in a few seconds with a simple 2D selfie, two core measurements, height, waist and two additional measurements, either bust, hip or weight and body shape which can be chosen from a visual.

During execution of fashion application 26, the user is provided guidance and cues to get the selfie right and a realistic avatar (e.g., virtual representation). The avatar created by the user can be edited to further customize and personalize. With the 3D avatar created, the user can then use a marketplace (e.g., as provided by execution of fashion application 26) to find apparel, accessories, beauty, and personal care products from different vendors and add them to the virtual fitting room for look and fit evaluation. Users, via fashion application 26, can also search for related items based on an existing image of an apparel or a picture taken of the apparel. The closest match found can be added to the fitting room for look and fit evaluation.

User can then evaluate and compare the apparel in a virtual fitting room, displayed via execution of fashion application 26, for look and fit by just toggling apparel available in the virtual fitting room and experience a full makeover with accessories, beauty and personal care products. Users can also place themselves in different environment settings like a town square to get a realistic sense of look and fit. Users can share their avatars with the full makeover with their friends and family for comments and feedback and complete their purchase with the shopping cart.

Figure 3:
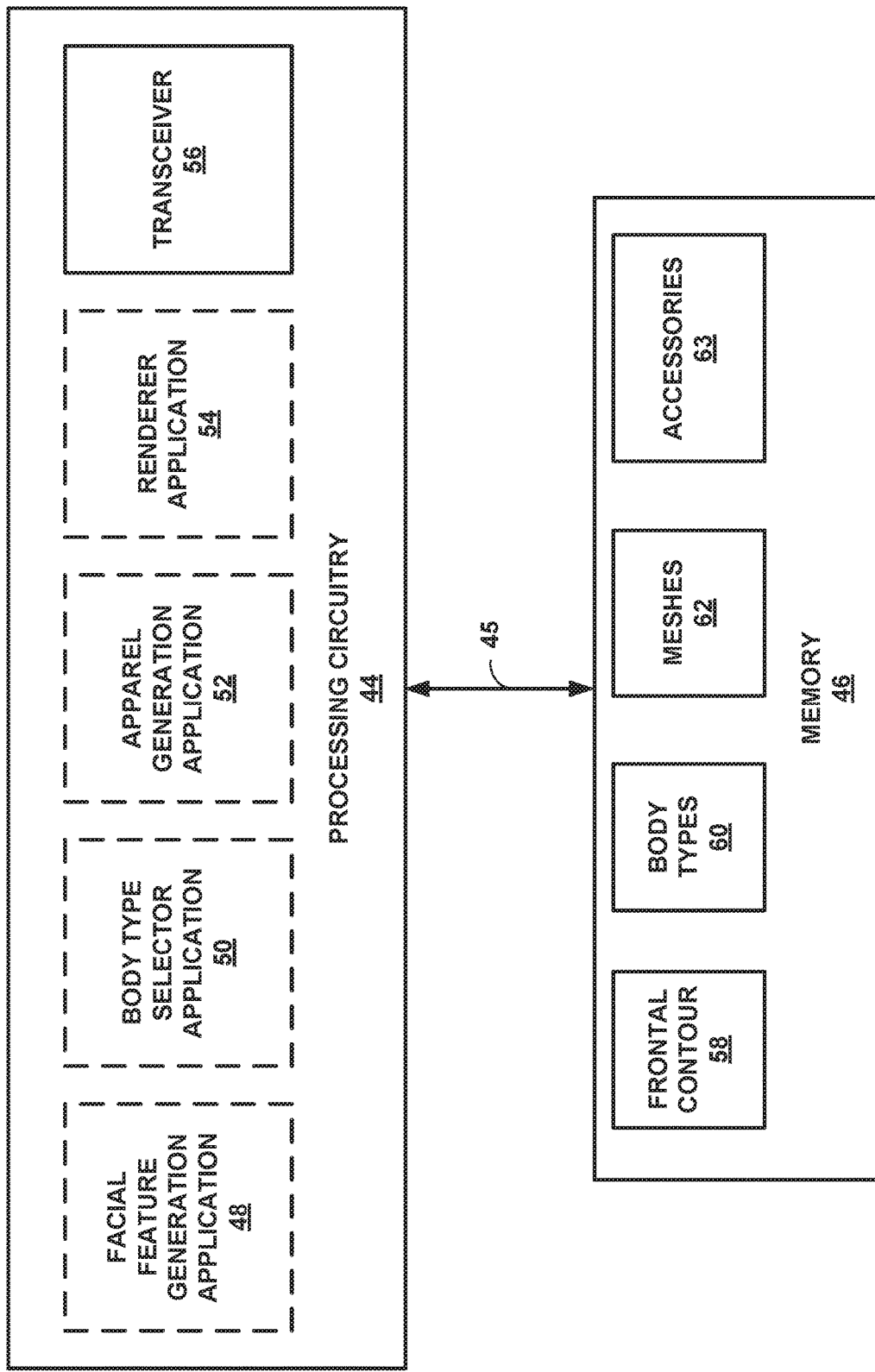
FIG. 3 is a block diagram illustrating an example of processing circuitry configured to render virtual representations of users in accordance with one or more example techniques described in this disclosure.

FIG. 3 is a block diagram illustrating an example of processing circuitry configured to render virtual representations of users in accordance with one or more example techniques described in this disclosure. FIG. 3 illustrates processing circuit 44 and memory 46. Processing circuitry 44 and memory 46 may be distributed across one or more network computing devices 18 within cloud 16. For example, as described above, cloud 16 provides a computing infrastructure where operations are distributed across network computing devices 18. Accordingly, FIG. 3 may be considered as illustrating one or more network computing devices 18 that include processing circuitry 44 and memory 46.

For example, processing circuitry 44 is illustrated as executing facial feature generation application 48, body type selector application 50, and renderer application 54. Transceiver 56 is circuitry with which processing circuitry 44 receives and transmits information. Also, memory 46 is illustrated as storing frontal contour 58, body types 60, meshes 62, and accessories 63. However, it may be possible, based on control of cloud 16 or workload of network computing devices 18 that one or more of the applications shown as executing on processing circuitry 44 execute on different network computing devices 18. Also, it may be possible that different network computing devices 18 each store some of the information shown to be stored in memory 46. For example, one network computing device 18 stores a subset of body types 60, another one of network computing device 18 stores another subset of body types 60, and so forth. The same may be true for meshes 62 and accessories 63.

The example of FIG. 3 captures these various examples where processing circuitry 44 and memory 46 are distributed among one or more network computing devices 18. As illustrated, processing circuitry 44 and memory 46 communicate via communication channel 45. Communication channel 45 may be a bus, similar to bus 40 of FIG. 1. In some examples, communication channel 45 may be a packet-based network, such as a local area network, a wide-area network, or a global network such as the Internet.

Processing circuitry 44 may be formed as at least one of fixed-function or programmable circuitry such as in one or more microprocessors, application specific integrated circuits (ASICs), field programmable gate arrays (FPGAs), digital signal processors (DSPs), or other equivalent integrated or discrete logic circuitry. Also, memory 46 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), flash memory, a magnetic data media or an optical storage media.

Although the example of FIG. 3 shows applications executing on processing circuitry 44, the example techniques are not limited to any particular type of processing circuitry. In general, processing circuitry 44 may be configured to perform one or more example techniques described in this disclosure via fixed-function circuits, programmable circuits, or a combination thereof. Fixed-function circuits refer to circuits that provide particular functionality and are preset on the operations that can be performed. Programmable circuits refer to circuits that can programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Processing circuitry 44 may include arithmetic logic units (ALUs), elementary function units (EFUs), digital circuits, analog circuits, and/or programmable cores, formed from programmable circuits. In examples where the operations of processing circuitry 44 are performed using software executed by the programmable circuits, memory 46 may store the object code of the software that processing circuitry 44 receives and executes. For example, memory 46 stores the object code for facial feature generation application 48, body type selector application 50, and renderer application 54 that processing circuitry 44 retrieves and executes.

Also, facial feature generation application 48, body type selector application 50, apparel generation application 52, and renderer application 54 are illustrated as separate simply to ease with understanding. Facial feature generation application 48, body type selector application 50, apparel generation application 52, and renderer application 54 may be structured as software functions that are called by high-level application executing on processing circuitry 44. In some examples, facial feature generation application 48, body type selector application 50, apparel generation application 52, and renderer application 54 may be integrated into a common application that processing circuitry 44 executes.

Processing circuitry 44 receives an image that includes the face of the user and body measurements. Facial feature generation application 48 may be configured to determine key facial points of reference such as face outline, eyes, nose, lips, cheek-bone, and jaw-line. The output of facial feature generation application 48 may be a data file that identifies facial outline from the image and includes information to extract out the front face portion for further processing. Also, the key facial features are used to extract out various parts of the face (lips, nose, cheeks, eyebrows, etc.), which can then later be applied to the deformed user face.

In some examples, facial feature generation application 48 may determine average skin complexion of the user. For example, facial feature generation application 48 may determine the red-green-blue (RGB) values of the pixels that form the face and perform an averaging algorithm to determine average skin complexion. Facial feature generation application 48 may use the average skin complexion to back calculate the impact of lighting conditions on the user face with respect to their average skin complexion and determine approximate relative distances of various points on the face. Based on the approximate relative distances, facial feature generation application 48 determines the 3D facial shape and contours as estimates of the face shape and contour of the user. The 3D facial shape and contours, as well as average skin complexion, key facial features points, and the like are examples of facial features extracted from the image.

Facial feature generation application 48 may store information of the facial features extracted from the image in memory 46 or local memory of processing circuitry 44. Facial feature generation application 48 retrieves the facial features and retrieves frontal contour 58 on which to apply deformations based on the facial features. For example, frontal contour 58 may be information of a 3D mesh of primitives (e.g., triangles, but other shapes are possible) that form a shape of the human head. The information of the 3D mesh of primitives may include vertex coordinates for the vertices in the 3D mesh, and information that indicates how the vertices are connected together. Frontal contour 58 may be considered as a default deformable 3D face model.

Based on the facial features (e.g., face shape and contour), facial feature generation application 48 may determine the deformations needed to apply to frontal contour 58 and stored information indicative of the deformations needed to apply (e.g., in the local memory or memory 46). The deformations needed to apply to frontal contour 58 may be a series of equations that indicate how the vertices of the 3D mesh of primitives are to shift. For example, if the user has a longer head, facial feature generation application 48 may determine how to stretch out the primitives of frontal contour 58 to form the head. If the user has a thicker head, facial feature generation application 48 may determine how to expand out the primitives of frontal contour 58, and so forth.

To perform such shifting, frontal contour 58 may include a head portion and a neck portion, with the neck portion ending with a neck seam, and the 3D mesh may include vertices of primitives for the head and neck portion and the neck seam. As described in more detail, facial feature generation application 48 may determine deformations to apply to frontal contour 58, such as deformations to apply to the head and neck portion. However, facial feature generation application 48 may not determine (or at least not apply) deformations to the neck seam to ensure that the neck seam lines up with the body. In some examples, facial feature generation application 48 may determine some deformations along the neck moving up from the neck seam (e.g., no deformations at the neck seam, and gradual deformations up the neck portion).

Facial feature generation application 48 may apply the deformations determined based on the facial features to frontal contour 58 to create a user face shape. Facial feature generation application 48 may apply (e.g., via texture mapping) the skin color and texture for various parts of the face, as extracted via facial extraction application 58, to the deformed frontal contour to create a near-real 3D face model of the user. In some examples, renderer application 54 renders (e.g., draws) the deformed frontal contour with the colors and textures, and stores the result standard 3D object formats such as .obj, .ply, .stl, .glts, .fbx, etc. depending on the rendering environment requirements (e.g., based on the rendering capabilities of personal computing device 12.

Body type selector application 50 receives body type information of the user. For example, as described above, the user may input body type information such as height, waist, bust/chest, hip, and/or weight measurements, and/or visual body type selection (e.g., apple, pear, rectangle, etc.). These measurements may be adequate from a fit perspective for standard machine-manufactured apparel as they are designed on similar body types. In some examples, body type selector application 50 may determine these measurements from full body pictures, which can avoid the user having to enter measurements. As users are likely to wear different sizes of apparel in different pictures (e.g., loose fitting or tight fitting), body type selector application 50 may utilize multiple pictures to determine an accurate estimation of the body type.

Based on the body type information, body type selector application 50 determines a body type from body types 60. For example, body types 60 are a database of pre-modelled 3D body avatars (without face or neck). Body type selector application 50 may identify the nearest match to body types 60 by matching measurements and anthropometric ratios provided by the user with measurements and anthropometric ratios of the pre-modelled 3D body avatars.

As one example, body type selector application 50 uses a k-nearest neighbors based classification to determine one of body types 60 based on the input measurements (e.g., body type information). For example, body type selector application 50 may first determine which ones of body types 60 have the same parameter as a first parameter of the body type information (e.g., which ones of body types 60 have the same height parameter as the height parameter of the user provided body type information). Based on the determination, body type selector application 50 may reduce the number of body types 60 to evaluate substantially down to a first subset of body types 60. Next, body type selector application 50 may determine which ones of the first subset of body types 60 have the same parameter as a second parameter of the body type information (e.g., which ones of body types 60 have the same waist parameter as the waist parameter of the user provided body type information). Based on the determination, body type selector application 50 may reduce the number of body types 60 to evaluate even further down from the first subset of body types 60 to a smaller, second subset of body types 60. Body type selector application 50 may repeat these operations until there is one remaining one of body types 60.

In some examples, rather than continuously reducing subsets of body types 60, body type selector application 50 may determine a Euclidean distance to determine the "closest" one of the remaining body types 60. For instance, each body type parameter may be considered as coordinates of a Euclidean point, and body type selector application 50 may determine Euclidean distances with each of body types 60.

For example, assume that the user input body type information includes four parameters (user P1, user P2, user P3, and user P4). In this example, to determine Euclidean distance with a particular body type of body types 60, body type selector application 50 may determine the difference between each of the four parameters and their respective parameters of particular body type. Body type selector application 50 may square the differences, sum the results, and determine the square root to determine the distance. For example, body type selector application 50 may determine: sqrt((user P1−body type 60A P1)$^2$+(user P2−body type 60A P2)$^2$+(user P3−body type 60A P3)$^2$+(user P4−body type 60A P4)$^2$) equals the distance to the particular body type, which is represented as body type 60A in the above equation. In some examples, to assign more value to a particular parameter (e.g., feature), body type selector application 50 may determine weighted distances which bias the result towards the dominant parameter (e.g., body type selector application 50 may select a body type from body types 60 which fits better on the user from waist point of view than height point of view). Based on the distances, body type selector application 50 may determine which one of body types 60 is the closest match to the body type of the user.

After selecting the body type, renderer application 54 may render the deformed frontal contour with a body type (e.g., as selected by body type selector application 50) based on aligning the body type with a neck seam of the deformed frontal contour to create a virtual representation of the user. In one or more examples, each one of body types 60 may be constructed such that where the neck is to attach on body types 60 substantially aligns with the neck seam of frontal contour 58. As described above, facial feature generation application 48 may not perform (or perform minimal) deformations on the neck seam of frontal contour 58. Therefore, after deformation, the neck seam of the deformed frontal contour should substantially align any one of body types 60. Accordingly, the neck seam of the deformed frontal contour, as generated by facial feature generation application 48, should substantially align the selected one of body types 60, as selected by body type selector application 50. By keeping the neck seam rigid during deformations (e.g., not deforming the neck seam), the deformed frontal contour align spatially with the neck seam of body types 60 (e.g., top of body types 60).

To render the deformed facial contour and the selected body type, renderer application 54 may blend vertices that form the neck seam with vertices at the top of mesh that forms that selected body type. The result of the blending may be a continuous structure that looks like the face and body type of the user (e.g., the result of the rendering is a body that looks like the user). Renderer application 54 may utilize the average skin color to color in the body, head, and neck of the user so that the result of the rendered head and body is aligned spatially, as well as color and texture wise. Renderer application 54 may generate the result, for export (e.g., outputting), in any of the standard 3D object formats (e.g., .obj, .ply, .stl, .fbx., .glts, etc.).

In this way, processing circuitry 44 is an example processing circuitry configured to receive an image (e.g., via transceiver 56) of a user and deform frontal contour 58 based on facial features of the image. As described, frontal contour 58 includes a head portion and a neck seam, and processing circuitry 44 may deform the head portion, but avoid deforming (e.g., bypass deforming) the neck seam.

Processing circuitry 44 may render the deformed frontal contour with a body type of body types 60 based on aligning the body type with a neck seam of the deformed frontal contour to create a virtual representation of the user. Processing circuitry 44 may then output (e.g., via transceiver 56) graphical information based on the virtual representation of the user. Examples of the graphical information includes the 3D object formats such as in .obj, .ply, .stl, .fbx., .glts, etc.

According to techniques of this disclosure, processing circuitry 44 may be configured to create 3D apparels from 2D images using image recognition techniques and real-time rendering on user generated customized avatars. Existing techniques for creating 3D meshes for apparels involve creation of a CAD/CAM (dxf) file first matching the pattern of the garment. This is similar to designing the apparel virtually after which the texture and color of the apparel is provided, and all the panels of the apparel are stitched together to create the 3D mesh. This is a time-consuming method that requires manual intervention at various stages to get the correct 3D mesh for the apparel.

This disclosure describes techniques for automatically generating a 3D mesh of an apparel based on details provided by 2D images of that apparel. To generate virtual apparel to apply to the virtual representation of the user, memory 46 stores a plurality of meshes ("meshes 62"). Meshes 62 may, for example, be created from CAD/CAM (dxf) files and may include meta-tags that store parameters. The parameters may, for example, include information regarding the pattern, style, color, print, and/or fabric for the mesh. Each mesh of meshes 62 may have an associated pattern and color. Each mesh of meshes 62 may be identified with their swatches for color & print level information. Each mesh of meshes 62 may also include fabric information provided for each of the existing pattern types.

In this context, pattern generally refers to a type of garment and represents the overall silhouette of the 3D mesh which is under consideration. Examples of patterns include a shirt, a trouser, t-shirt, dress, etc. In this context, style generally refers to a type of a pattern. For example, long sleeved, short sleeved, collared, etc. may all be styles of shirts. Fabric information generally refers to the property of the cloth being used in the apparel, and print is the design being used on that cloth to make the garment. Both are used to recreate the apparel. Examples of prints include stripes, checkers, floral, etc. or may include logos or other images.

Processing circuitry 44 receives an image that includes a piece of apparel. Apparel generation application 52 may be configured to select a mesh from meshes 62 based on an analysis of the image of the apparel. Once the image for the apparel is provided, by personal computing device 12 for example, apparel generation application 52 may perform image recognition on the image to capture information about the pattern, style, color, print, fabric, and other these key parameters for the apparel in the image. Apparel generation application 52 may store, in one or more files in memory 46 for example, meta-tags that include the captured information.

As introduced above, in order to facilitate selecting of a mesh from meshes 62, each mesh of meshes 62 may have an associated set of parameters. Apparel generation application 52 may be configured to determine parameters of the apparel based on the image and compare the parameters of the apparel to the parameters for the plurality of meshes. Examples of parameters include a pattern, style, color, print, and fabric.

Apparel generation application 52 may be configured to identify a closest matching apparel from meshes 62 using image recognition techniques and the generated meta-tag information. For example, to select a mesh from meshes 62 based on an analysis of the image, apparel generation application 52 may be configured to determine a style parameter for the apparel in the image and determining, from meshes 62, a mesh with a same style parameter. Additionally, or alternatively, to select a mesh from meshes 62 based on an analysis of the image, apparel generation application 52 may be configured to determine a pattern parameter of the apparel in the image and determine, from the plurality of meshes, a mesh with a same pattern parameter. Apparel generation application 52 may also use other parameters for determining the closest matching mesh. Apparel generation application 52 may also determine a basic color for the determined mesh.

As one example, apparel generation application 52 may be configured to determine a closest matching apparel using results provided by a visual search engine. The results may, for example, include meta-tags such as, apparel category (e.g., t-shirt, shirts, dress, jumpsuits, trouser, jeans, etc), type of neckline (e.g., round, v-neck, etc), sleeve style, sleeve length, apparel length (e.g., long, short, above knee, etc), apparel pattern (e.g, printed, stripes, checks/plaid, solid, etc), and apparel color. The visual search engine may be trained using meshes 62, such that the visual search engine is configured to find various features in meshes 62 in the images of apparels provided by a user. Both the results are provided with confidence scores (percentage confidence of matching of each inventory in that category). In some examples, apparel generation application 52 may return two kinds of results. First, apparel generation application 52 identifies the matching based on visual appearance and pattern. Second, based on the meta data extracted from the image like category, collar type, etc., apparel generation application 52 may assigns a confidence score on both kind of findings. The closest apparel mesh is estimated by comparing the confidence scores from the results and meta-tag matching.

Apparel generation application 52 may be configured to generate a swatch based on the image and apply the swatch to the mesh to generate the virtual apparel. To generate the swatch, apparel generation application 52 may be configured to determine one or more of a texture, color, or print information for the apparel in the provided image and convert this information into apparel swatches to be applied to the selected mesh from meshes 62.

Apparel generation application 52 may be configured to apply image recognition and image processing techniques in the process of creation of the new swatches for the selected apparel pattern. For example, apparel generation application 52 may be configured to perform region detection from an image. To get the maximum information out of a 2D image of an apparel, apparel generation application 52 may be configured to detect specific regions from the image using deep learning models a visual object detection system (e.g., Mask R-CNN) and generate the swatches for those regions individually. Examples of these regions include collar, sleeve, cuff, neckline, pocket, yoke, placket, waistbands, cuff-bottoms and fly. Apparel generation application 52 may be configured to perform color extraction. Apparel generation application 52 can pick separately from the regions detected by the visual object detection system and apply to the pre-existing swatches of the mesh selected before. Each swatch represents a particular region in the mesh like collar, sleeve, pocket, etc. Apparel generation application 52 extracts the color values from the image using, for example, colorgram.py library. Apparel generation application 52 may pick the color values from image pixel by pixel and store the pixel count for a color, e.g., how many times each color repeats. In some implementations, apparel generation application 52 may ignore color values having transparency (i.e. alpha <0.5) in RGBA color space to prevent misidentification of colors. Apparel generation application 52 stores the identified colors by ranks of their dominance calculated using the count (percentage of color represent in that image). The pre-existing swatches are stored with their dominant color information, for example, number of colors present in the swatch and the order of dominance with respect to the original mesh. These colors are then applied to the swatch according dominant order provided in the swatch information.

Apparel generation application 52 may also be configured to apply fabric data to the 3D apparel meshes. Apparel generation application 52 can apply fabric level information gathered from meta-tags of the apparel to achieve the right look and granularity.

To get the maximum information out of a 2D image of an apparel, apparel generation application 52 may be configured to detect specific regions in the apparel using deep learning models. The deep learning models may, for example, be configured to detect objects within an image using a visual object detection system such as Mask R-CNN (region-based convolutional neural networks). The swatches for the detected regions may be generated individually. Apparel generation application 52 may, for example, use a custom Mask R-CNN to generate a model that can be trained using a repository of images containing different kinds of apparels. Based on the training, the model can be configured to detect different classes. The classes (e.g., regions detected using the visual object detection system) may, for example, include collar, sleeve, cuff, neckline, pocket, yoke, placket, waistbands, cuff bottoms, and fly.

Apparel generation application 52 may also be configured to create textures and apply the textures to the 3D apparel meshes. Apparel generation application 52 may create the textures using image recognition techniques applied to the image provided by the user. Apparel generation application 52 may identify the texture of a given apparel from the image provided and then apply that texture, in the form of color and print swatches, on the 3D meshes in real-time.

To facilitate the creation of textures, meshes 62 may have identified swatches for color and print of each panel or region of the apparel. Details of each swatch in terms of pattern and/or style of coloring applied may be saved in the form of metatags to the image. Examples of swatch details include the swatch type (which region the swatch belongs to in the mesh example sleeve, pocket, collar, etc), total number of colors present in each swatch, and the order of coverage of the apparel mesh. This information may be pre-stored for each mesh. Once the 2D image for the apparel is obtained, apparel generation application 52 may apply image recognition techniques to the image to capture information about the color and print. Apparel generation application 52 may generate apparel swatches to apply the color and print. Apparel generation application 52 can convert the texture, color, and print information, as gathered from the provided image, into apparel swatches to be applied to the existing 3D mesh. This considers the manner in which existing swatches are applied on the 3D mesh and then the new swatches are organized in the same manner. We use proprietary image processing techniques in the creation of new swatches for the apparel.

Apparel generation application 52 may generate textures by replicating similar styles of swatches with the colors from the detected regions of the apparel 2D image. Apparel generation application 52 may be configured to extract colors from the 2D image pixel by pixel. In some examples, Apparel generation application 52 may be configured to ignore color values having transparency (i.e. alpha <0.5) in RGBA color space to prevent misidentification of colors.

Apparel generation application 52 can apply the swatches to the existing mesh to create a new 3D apparel with new texture, color, and print details. The schema of swatch application as prepared under proprietary methods of our platform leads to right allocation of new swatches for the 3D apparel. This leads to real-time creation of new 3D apparels in a highly efficient manner by utilizing the texture, color & print information from the 2D images provided.

Renderer application 54 may render the virtual apparel on the virtual representation. For example, renderer application 54 may output graphical information of the virtual apparel (e.g., as a 3D object). In this manner, the output from processing circuitry 44 may be graphical information of the virtual representation of the user along with the virtual apparel. Personal computing device 12 receives the output from processing circuitry 44 and GPU 28 renders the virtual representation with the virtual apparel on display 38 for the user to determine the style and fit. In this disclosure, processing circuitry 44 outputting graphical information includes examples where processing circuitry 44 renders the virtual representation and virtual apparel and outputs the resulting graphical information, or outputs the graphical information for the virtual representation and the virtual apparel separately.

By storing a plurality of meshes and selecting a mesh from the plurality of meshes based on an analysis of an image, in combination with other features described herein, a system such as system 10 may require little or no manual intervention in the real-time rendering of 3D apparel meshes based on user provided 2D images. Reducing or elimination the need for manual intervention potentially has the benefit of simplify ang improving a user experience. Furthermore, such an approach may reduce the amount of time needed to render on personal computing device 12, as well reduce the time needed for generation on processing circuitry 44. Accordingly, in some examples, a virtual apparel may be created relatively fast in cloud 16 and then rendered quickly on personal computing device 12.

Accessories 63 are examples of accessories and cosmetic products that are pre-registered in spatial alignment with frontal contour 58. For example, accessories 63 are pre-modeled so that accessories 63 fit on frontal contour 58 before any deformations. For example, processing circuitry 44 or some other computing device registers (e.g., identifies as corresponding) vertices of the 3D accessory or cosmetic product with respect to vertices on frontal contour 58 (e.g., by spatially registering the 3D surface of the accessory or cosmetic product with respect to the 3D surface of frontal contour 58). As illustrated, memory 46 stores the detailed propriety models as accessories 63 with all the information.

As described above, facial feature generation application 48 determines and stores information indicative of the deformations that are to be applied to frontal contour 58. In some examples, facial feature generation application 48 utilizes this stored information indicative of the deformations to determine how to morph (e.g., deform) accessories 63 to determine the style and fit of the accessory on the user. Facial feature generation application 48 may then deform the selected ones of accessories 63 In this manner, computational resources are not wasted recomputing how to deform accessories 63. Rather, deformations determined for deforming frontal contour 58 can be reused to deform accessories 63 to ensure that accessories 63 are spatially aligned with the virtual representation of the user.

Accordingly, in one or more examples, processing circuitry 44, via facial feature generation application 48, may determine deformations to apply to frontal contour 58 based on the facial features in the image, and apply the deformations based on the determined deformations. Processing circuitry 44 may retrieve a model of an accessory or cosmetic product (e.g., one of accessories 63) based on user selection. In some examples, the model of the selected one of accessories 63 is pre-registered in spatial alignment with frontal contour 58. Because accessories 63 are pre-registered in spatial alignment with frontal contour 58, facial feature generation application 48 may be able to apply deformations determined as part of deforming frontal contour 58 to deform the selected one of accessories 63.

Renderer application 54 may render the deformed model of the selected one of accessories 63 on the virtual representation. For example, renderer application 54 may output graphical information of the deformed model of the accessory or cosmetic product (e.g., as a 3D object). In this manner, the output from processing circuitry 44 may be graphical information of the virtual representation of the user along with the chosen apparel and chosen accessories. Personal computing device 12 receives the output from processing circuitry 44 and GPU 28 renders the virtual representation with the apparel and accessories on display 38 for the user to determine the style and fit. In some examples, processing circuitry 44 may separately output graphical information of the virtual representation and the virtual representation of the apparel and/or accessories. In such examples, GPU 28 may render the virtual representation, the virtual apparel, and/or the virtual accessories and stitch them together. In this disclosure, processing circuitry 44 outputting graphical information includes examples where processing circuitry 44 renders the virtual representation, virtual apparel, and virtual accessories together, and outputs the resulting graphical information, or outputs the graphical information for one or more of the virtual representation, virtual apparel, and virtual accessories, separately.

The above example techniques may be utilized to generate a static low-polygon 3D virtual representation, which is efficient to use for style and fit evaluation of apparel and accessories. Having such a static low-polygon 3D virtual representation may be beneficial because it reduces the amount of time needed to render on personal computing device 12, as well reduce the time needed for generation on processing circuitry 44. Accordingly, in some examples, the static low-polygon 3D virtual representations may be created relatively fast in cloud 16 and then rendered quickly on personal computing device 12.

Figure 4:
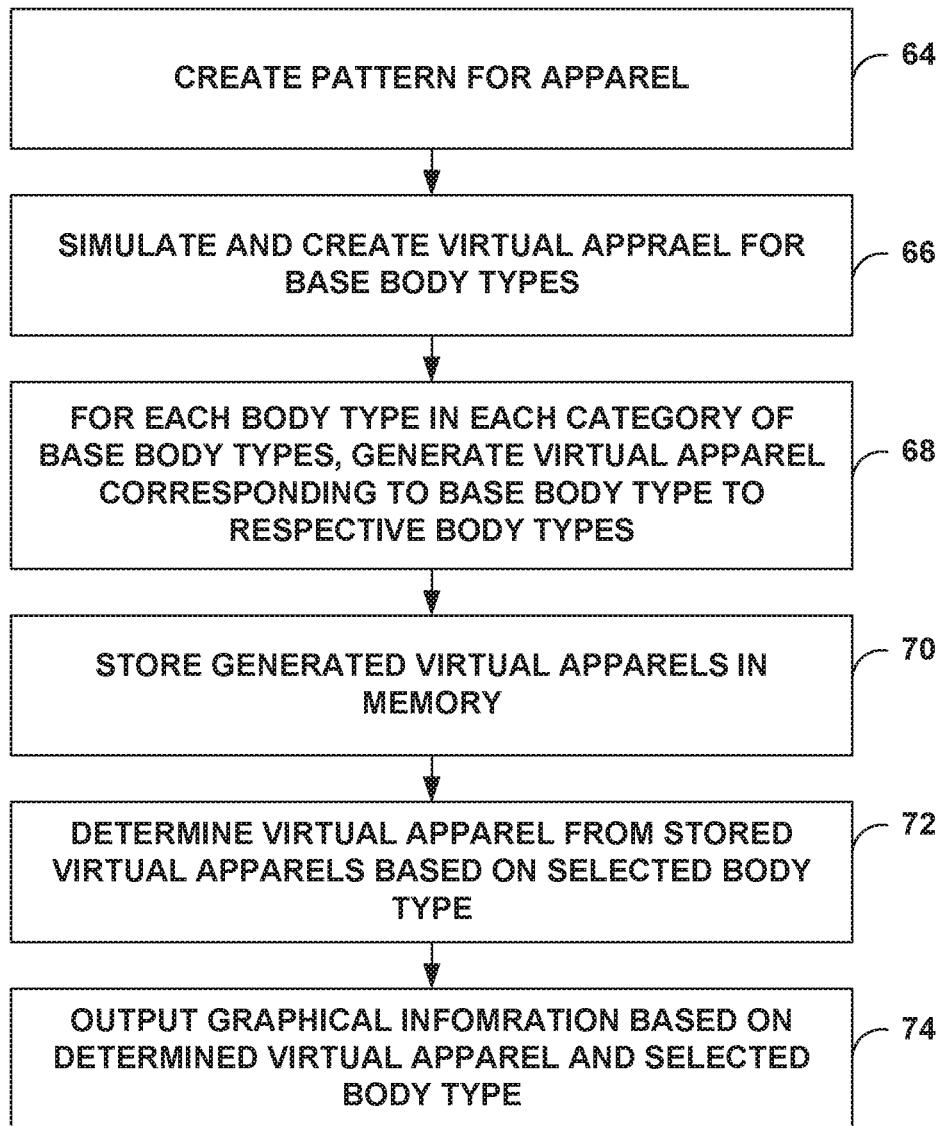
FIG. 4 is a flowchart illustrating an example method of generating and outputting virtual apparels in accordance with one or more example techniques described in this disclosure.

FIG. 4 is a flowchart illustrating an example process for generating and outputting virtual apparels in accordance with one or more example techniques described in this disclosure. In one or more examples, a user may desire to determine how apparels would appear on his or her body. To achieve that, processing circuitry 44 may be configured to generate a plurality of virtual apparels (e.g., via execution of an apparel generating application). For example, processing circuitry 44 may execute the apparel generation application.

To create the plurality of virtual apparels, an administrator may create a pattern for an apparel (64). For example, the administrator may take an image of the apparel or find an image of the apparel (e.g., online). In some examples, a designer or user may upload the image. For example, a designer may consider the ability of users to virtually try the style and fit as good advertisement, and may therefore provide the image. As another example, a user may identify an apparel for which he or she wants to determine the style and fit for his or her body.

Based on the image, the administrator may define key points on the apparel, and primitives that are used to form the apparel. From this, the administrator may define a virtual apparel mesh, and define color for the mesh based on the color in the image.

The administrator may then load up, for display on a local display, base body types from body types 60 and modify the virtual apparel mesh to fit each of the base body types (66). A base body type is a body type for which standard sizes are generated. For example, the base body types are body types that define the standard sizes of XXS (extra-extra-small), XS, S, M (medium), L (large), XL, XXL, and XXXL. For each of these body types, the administrator may manually modify the virtual apparel mesh on top of graphical presentations of body types of body types 60 that correspond to body types for these standard sizes. The administrator may store information that indicates how the virtual apparel mesh was modified for each of the base body types.

For each body type in each category of base body types, processing circuitry 44 may generate virtual apparels corresponding to each of body types 60 based on the base body types (68). Although there is a base body type that defines each of these standard sizes, there may be a plurality of body types that each fall under the same size category. For example, there may be a plurality of body types 60 for which each of the standard sizes would fit. For instance, there may be a plurality of body types 60 that would all fit under XXS, a plurality of body types 60 that would all fit under XS, and so forth.

For each of the body types in a standard size category, processing circuitry 44 may determine a difference in the body type and the base body type. Based on the difference, processing circuitry 44 may determine deformations (e.g., morphs) to apply to the virtual apparel for the base body type, and processing circuitry 44 may generate a virtual apparel that fits the corresponding body type. Processing circuitry 44 may store graphical information for the generated virtual apparel in memory 46. These operations may be all automated and require little or no human interference.

As an example, assume there are 100 body types that all fall under the L (large) category. For the first of the 100 body types, processing circuitry 44 may determine the difference in the first body type and the base body type for size L. Based on the difference, processing circuitry 44 may deform the virtual apparel for the base body type for size L to generate a virtual representation for the first body type. For the second of the 100 body types, processing circuitry 44 may determine the difference in the second body type and the base body type for size L. Based on the difference, processing circuitry 44 may deform the virtual apparel for the base body type for size L to generate a virtual representation for the second body type, and so forth. Processing circuitry 44 may store information for the resulting virtual apparels (e.g., virtual representations of the apparels) in memory 46.

In one or more examples, processing circuitry 44 may receive information from the user regarding for which apparel he or she wants to determine the style and fit. As described above, processing circuitry 44 may select a body type for the user based on user provided body type information. Processing circuitry 44 may determine a virtual apparel from the stored virtual apparels based on the selected body type (72). For example, assume that processing circuitry 44 selected the second body type of the 100 body types for size L for the user. In this example, processing circuitry 44 may determine the virtual apparel generated for the second body type of the 100 body types for size L, as described above, based on the selected body type being the second body type of the 100 body types for size L.

Processing circuitry 44 may output graphical information based on the determined virtual apparel (74). As one example, processing circuitry 44 may render the determined virtual apparel on top of the virtual representation of the user generated using the above example techniques. In this example, the graphical information may be considered as the combination of the virtual apparel rendered on the virtual representation. As another example, processing circuitry 44 may output the graphical information for the determined virtual apparel and output the graphical information for the virtual representation. GPU 28 may then render the virtual apparel on top of the virtual representation.

In this way, an administrator may simulate apparel across body types for standard size categories, which are much less in number compared to total number of body types 60, and generate and store information for these virtual apparels (e.g., as garment files). Processing circuitry 44 may automatically simulate virtual apparels across all body types 60 belonging to these size categories. For each size category, the virtual apparel corresponding to the base body type for the base size is loaded, and then all body types in that size category are loaded one after the other as morphed targets (e.g., the targets to which the virtual apparel for the base body type for the base size is to be deformed). The steps of loading, simulation, and storing virtual apparels for the different body types, using 3D simulation software, is automated to require least human intervention.

Figure 5:
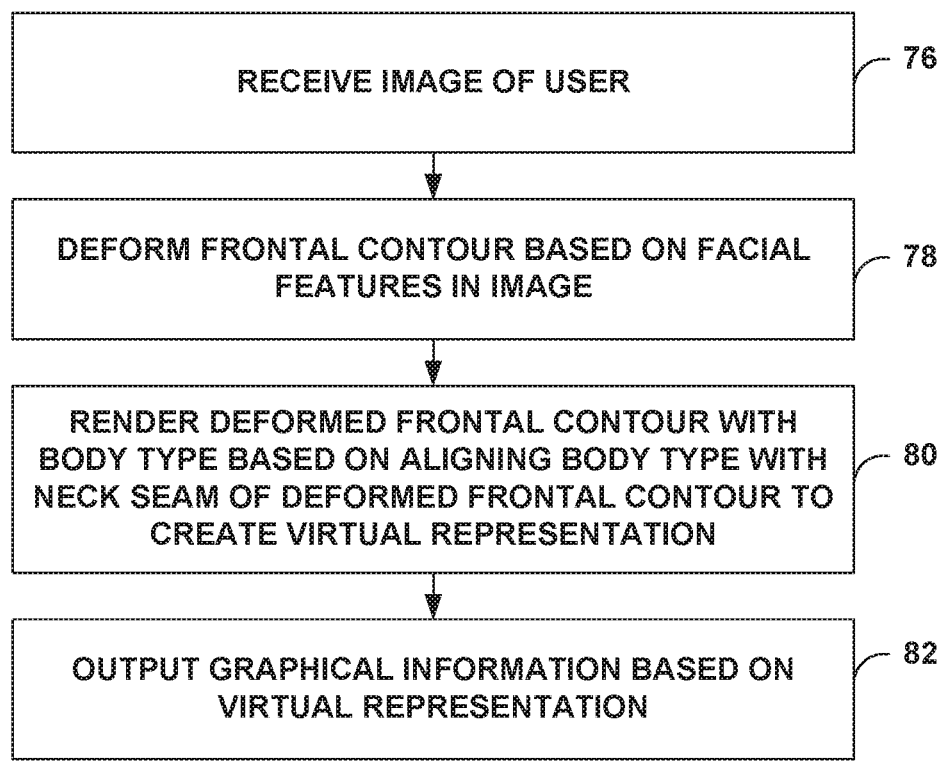
FIG. 5 is a flowchart illustrating example operations of virtual representation creation of a user.

FIG. 5 is a flowchart illustrating example operations of virtual representation creation of a user. Processing circuitry 44 may receive an image of a user (76). The image of the user includes an image of the frontal face of the user. Processing circuitry 44 may deform a frontal contour based on facial features of the image (78).

For example, processing circuitry 44 may execute facial feature generation application 48. Processing circuitry 44, via execution of facial feature generation application 48, determines skin areas in a face of the user in the image, determines an average skin complexion based on the skin areas, determines impact of lighting conditions based on the average skin complexion, determines relative distances of various points on the face based on the determined impact of the lighting conditions, and determines the facial features, including face shape and contour, based on the determined relative distances.

Based on the face shape and contour, facial feature generation application 48, executing on processing circuitry 44, determines the deformations to apply to facial contour 58 based on the face shape and contour. Facial feature generation application 48 may then apply the determined deformations to frontal contour 58. For example, frontal contour 58 includes a head portion and a neck seam (e.g., the bottom of a neck portion of frontal contour 58). Facial feature generation application 48 may apply the determined deformations to the head portion, and avoid deforming the neck seam (e.g., keep the neck seam rigid).

Processing circuitry 44, via renderer application 54, may render the deformed facial contour with a body type based on aligning the body type with a neck of the deformed frontal contour to create a virtual representation of the user (80). For example, as described above and described in more detail with respect to FIG. 6, processing circuitry 44, via execution of body type selector application 50, may select a body type for the user. The body type that processing circuitry 44 selects may be from body types 60 that are specifically constructed such that the neck seam of the body types 60 aligns substantially with the neck seam of frontal contour 58 (e.g., so that the ends of the neck seams line up, and the curvature of the neck seams line up). As described above, alignment of the neck seams means that the ends of the neck seams line up, and the curvature of the neck seams line up such that when the neck seam of the frontal contour and the neck seam of the body type line up to form a contiguous connection between head and body, with little to no gaps or such that the neck seam of the frontal contour does not extend beyond the neck seam of the body type, and vice-versa.

Because the neck seam of frontal contour 58 was not deformed during the deformation of frontal contour 58, a neck seam of the deformed frontal contour substantially aligns with the neck seam of the selected body type. Accordingly, renderer application 54 may blend the neck seam of the deformed frontal contour with the neck seam of the selected body type to create a virtual representation of the user.

Furthermore, in some examples, renderer application 54 may render skin color and facial texture to the deformed frontal contour. In such examples, renderer application 54 may render the deformed frontal contour having the skin color and facial texture with the body type (e.g., the selected body type selected by body type selector application 50).

Processing circuitry 44 may output graphical information based on the virtual representation (82). For example, processing circuitry 44 may output commands and graphics data in accordance with OpenGL such that GPU 28 of personal computing device 12 can interpret the commands and data and reconstruct the virtual representation on personal computing device 12.

Figure 6:
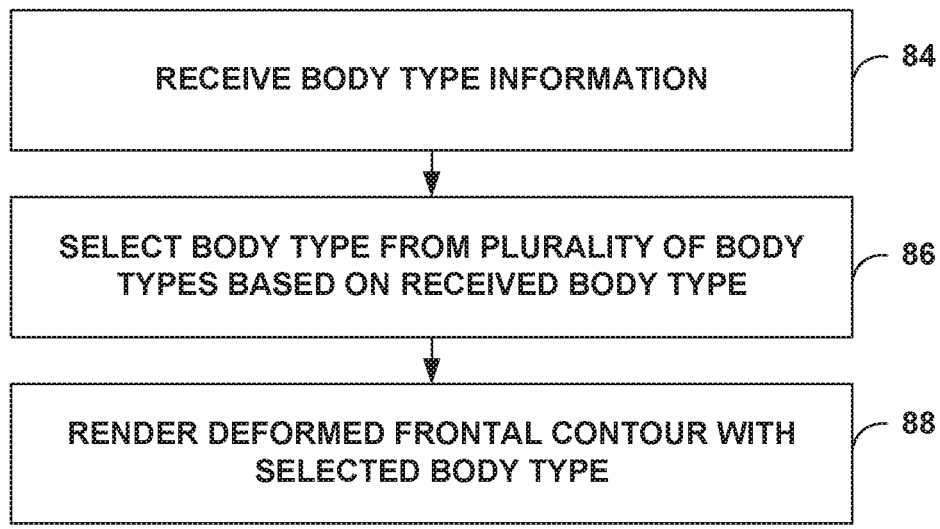
FIG. 6 is a flowchart illustrating example operations of selecting a body type for generating a virtual representation of a user.

FIG. 6 is a flowchart illustrating example operations of selecting a body type for generating a virtual representation of a user. In some examples, processing circuitry 44 receives body type information of the user (84). As one example, the user inputs height, weight, waist, bust/chest, etc. as body type parameters for the body type information. As another example, the user may provide a full body image from which processing circuitry 44 may determine the body type information.

Body type selector application 50, executing on processing circuitry 44, may select a body type from body types 60 as the body type that most closely matches the parameters of the body type information provided by the user (e.g., via input or via the image) (86). As one example, body type selection application 50 may determine a first subset of body types 60 from the plurality of body types 60 having the same parameter as a first parameter of the received body type information (e.g., determine body types 60 having the same height parameter as the height parameter of the received body type information). Body type selector application 50 may determine a second subset, from the first subset, having the same parameter as a second parameter of the received body type information (e.g., determine body types 60 from the first subset having the same waist parameter as the waist parameter of the received body type information).

Body type selector application 50 may determine a body type from the second subset of body types as a closest match to the received body type information to select the body type. For example, body type selector application 50 may determine a Euclidean distance between each body type in the second subset and determine which one of the body types in the second subset has the smallest distance. If there is a tie between multiple body types, then body type selector application 50 may utilize a tie breaking algorithm. For instance, body type selector application 50 may determine among the body types having the same Euclidean distance, which one has a third parameter that is closest to a third parameter of the user provided body type information, and try the fourth parameter, fifth parameter, and so on, until body type selector application 50 finds a body type where there is no tie. Body type selection application 50 may select that body type as the body type that is the closest match to the body type of the user.

Renderer application 54 may render the deformed frontal contour with the selected body type (88). For example, as described above, renderer application 54 may blend the neck seam of the deformed frontal contour with the neck seam of the selected body type to create the virtual representation of the user.

Figure 7:
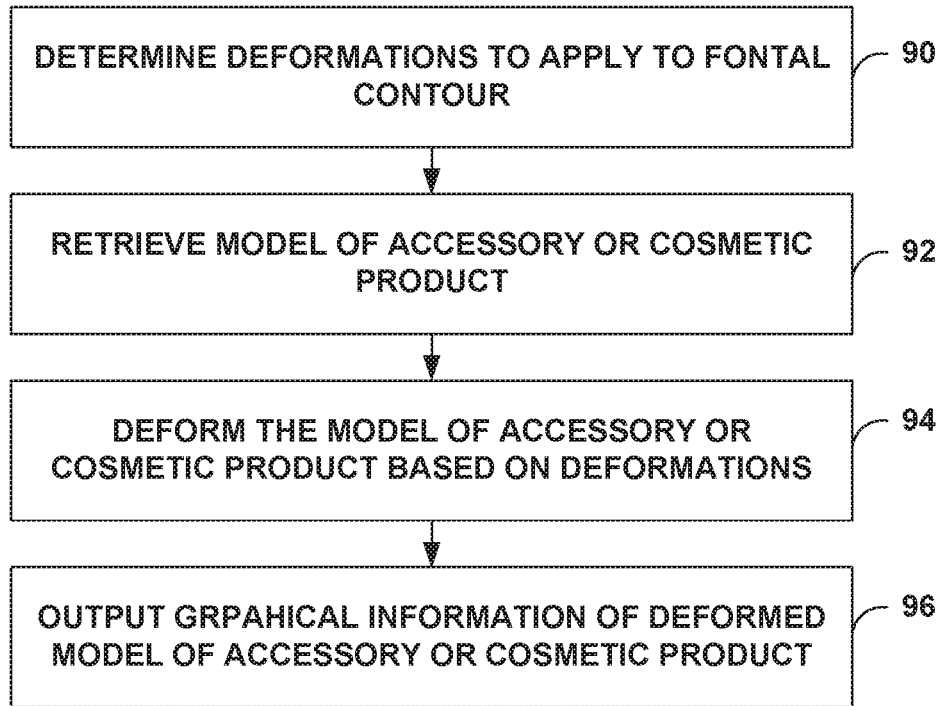
FIG. 7 is a flowchart illustrating example operations of generating a virtual representation accessories or cosmetics to apply to a virtual representation of a user.

FIG. 7 is a flowchart illustrating example operations of generating a virtual representation accessories or cosmetics to apply to a virtual representation of a user. As described above, during the deformations performed to frontal contour 58, facial feature generation application 48 may determine the deformations to apply to frontal contour 58 based on the facial features in the image of the face of the user (90).

Processing circuitry 44 may receive information indicating for which one of accessories from accessories 63 a user wants to determine the style and fit. Facial feature generation application 48 may retrieve a model of accessory from accessories 63 based on the user selection (92).

Facial feature generation application 48 may deform the model of the accessory product based on the determined deformations that deformation application had determined to be applied to frontal contour 58 (94). As described above, accessories 63 may be pre-registered in spatial alignment with frontal contour 58, which means that virtual representations of the accessories (e.g., accessories 63) may be formed such that accessories 63 fit on frontal contour 58. Therefore, deformations applied to frontal contour 58 may be indicative of deformations to be applied to accessories 63 for fast construction of accessories and how they will look on the user. For example, facial feature generation application 48 may scale, shift, expand, contract, etc. the model of the accessory based on the deformations applied to frontal contour 58.

Processing circuitry 44 may output graphical information of the deformed model of the accessory (96). As one example, renderer application 54 may render the deformed model of the accessory on-top-of the virtual representation of the user, and processing circuitry 44 may output graphical information for the combined virtual representation of the user with the deformed model of the accessory (e.g., virtual representation of the accessory). As another example, renderer application 54 may output the virtual representation of the user and output the virtual representation of the accessory. GPU 28 may then stitch the virtual representation of the accessory to the virtual representation of the user.

Figure 8:
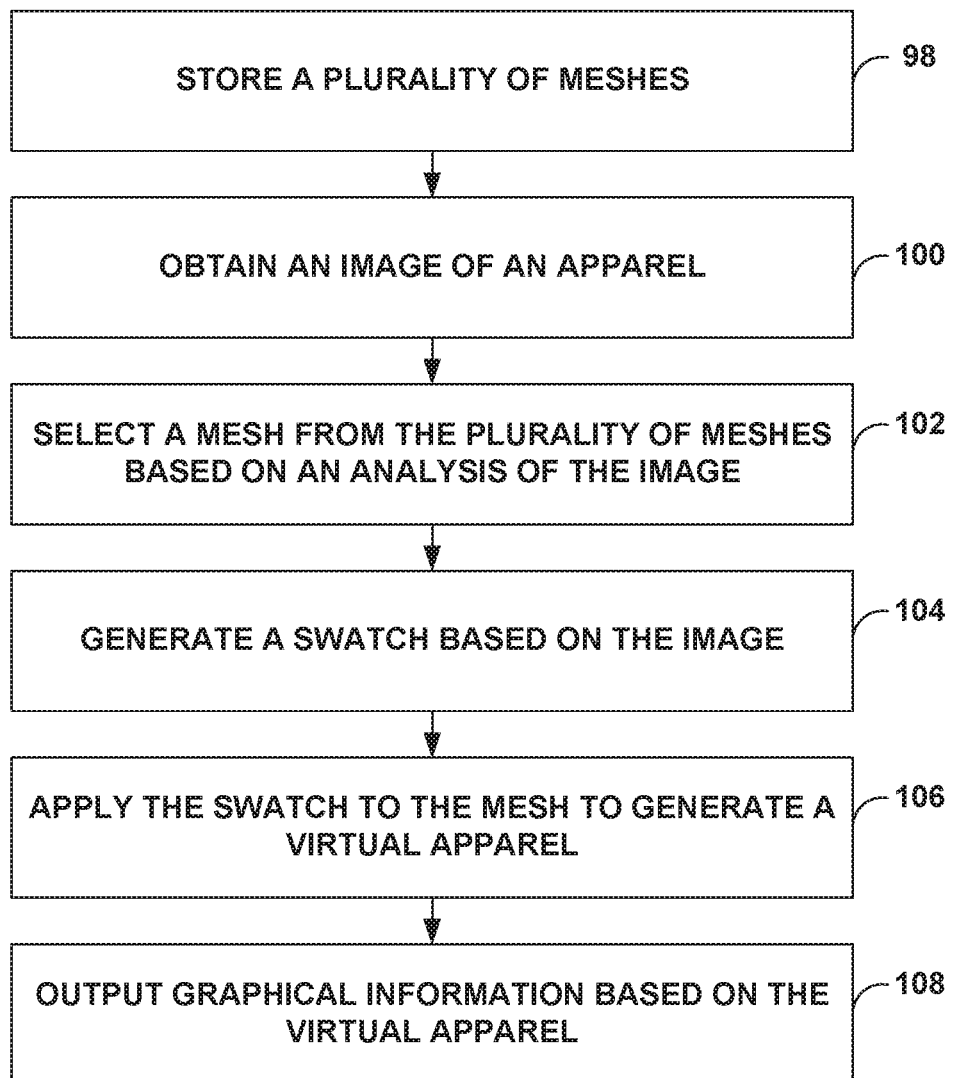
FIG. 8 is a flowchart illustrating example operations of generating a virtual apparel to apply to a virtual representation of a user.

FIG. 8 is a flowchart illustrating example operations of generating a virtual representation of apparel to apply to a virtual representation of a user. As described in more detail above, memory 46 may store a plurality of meshes (98). Each mesh of the plurality of meshes may have an associated set of parameters.

Processing circuitry 44 receives an image of an apparel (100). As one example, a user may identify the image of the apparel using personal computing device 12, and personal computing device 12 may transmit the image to cloud 16 via network 14. Processing circuitry 44 may receive the image of the apparel within cloud 16.

Processing circuitry 44 selects a mesh from the plurality of meshes stored in memory 46 based on an analysis of the image (102). For example, processing circuitry 44 may execute apparel generation application 52. Processing circuitry 44, via execution of apparel generation application 52, may select a mesh from the plurality of meshes based on the analysis of the image by determining a style parameter for the apparel in the image and determining, from the plurality of meshes, a mesh with a same style parameter. Additionally, or alternatively, processing circuitry 44, via execution of apparel generation application 52, may select the mesh from the plurality of meshes based on the analysis of the image by determining a pattern parameter of the apparel in the image and determining, from the plurality of meshes, a mesh with a same pattern parameter.

Processing circuitry 44 generates a swatch based on the image (104). To generate the swatch based on the image, processing circuitry 44 may determine a color of the apparel in the image and match a color of the swatch to the color of the apparel in the image. To generate the swatch based on the image, processing circuitry 44 may determine a texture of the apparel in the image and match a texture of the swatch to the texture of the apparel in the image. To generate the swatch based on the image, processing circuitry 44 may determine a print of the apparel in the image and match a print of the swatch to the print of the apparel in the image.

Processing circuitry 44 applies the swatch to the mesh to generate a virtual apparel (106). Processing circuitry 44 may output graphical information based on the virtual apparel. As one example, renderer application 54 may render the virtual apparel on-top-of the virtual representation of the user, and processing circuitry 44 may output graphical information for the combined virtual representation of the user with the virtual apparel. As another example, renderer application 54 may output the virtual representation of the user and output the virtual apparel. GPU 28 may then stitch the virtual representation of the accessory to the virtual representation of the user.

The following pseudo code describes an example process for generating a virtual apparel. In the pseudo code below, the operations described as being performed by a front-end interface may, for example, be performed by personal computing device 12, and the operations described as being performed by a backend server may be performed by network computing devices 18.

Front-End Interface:
1. Upload user selected image to Visenze Image Search results API and Visenze meta tags API
2. Get Visenze Response: Image search results, Meta tags with bounding box
3. Crop image as per bounding box
4. Upload cropped image to S3 server
5. On uploaded successfully, combine Visenze response (filter image search results as per Avataar gender)+uploaded image s3 path in json and call 2D-3D backend server In Backend Server (Written in Python),
1. Download image from S3 path
2. Start Parallel processing
Thread 1: Region detection using Mask R-CNN
Thread 2: Get SKU_ID and download texture files
Thread 1: Mask R-CNN is trained to detect following regions: sleeve, neckline, collar, cuff, pocket, placket, yoke, waistband, cuff-bottoms and fly.

```
PROGRAM MaskRCNN
Regions detected = MaskRCNN prediction on image
IF Regions detected has confidence score > 0.9 THEN
mask image = Create mask for that region.
END
```

Thread 2:
a. Map Visenze meta tags with meta-tags stored for each SKU in database
b. Get SKU_ID from meta-tags and image search results
c. Create CSV file of texture information of selected SKU

```
PROGRAM GetSKUID
READ meta-tags, image search results
FOR imageSearchResult in image search results
IF imageSearchResult confidence score > 0.5 AND
    (imageSeachResult confidence score > meta-tag confidence score OR
    imageSeachResult
sub category = meta-tag sub category) THEN
SKU_ID = imageSearchResult [ SKU_ID ]
return
ENDFOR
IF sku_id not found THEN
sku_id_list = Get SKU_IDs by matching all meta-tags
IF sku_id_list = nil THEN
SKU_ID = Get SKU_ID by matching few tags
return
ELSE
SKU_ID = Get SKU_ID present in both sku_id_list and
imageSearchResults
return
END
``` d. Download textures/swatches for the selected SKU_ID
e. Create CSV file of texture information fetched for selected SKU from database.
Note:
CSV Format: Swatch filename, TotalColors present in swatch, Dominant Color Information, Swatch file path, Swatch Type
Swatch Type refers to the region of apparel the swatch belongs to. This is same as regions detected in Mask R-CNN
End Parallel Processing
3. Apply PhotoRecolor Algorithm on swatches (written in C++)
PROGRAM PhotoReColorAlgorithm
READ csvFile, user_image (downloaded from S3), total number of colors in selected SKU.
user_image_without_background=Remove background from user_image using Grab-cut open cv library to avoid picking up unnecessary colors from background FOR swatch_info IN swatch_info_list read from csvFile READ TotalColors (present in swatch, Dominant Color Information, Swatch file path, Swatch Type, mask images created from Mask R-CNN region detection.
IF mask image present=Swatch type in swatch_info THEN
dest_palette=Pick TotalColors (present in swatch) from mask image and order them according to Dominant Color Information using colorgram.py library orig_palette=Pick TotalColors (present in swatch) from swatch image using colorgram.py library
Replace orig_palette to dest_palette in swatch image using algorithm taken from Palette-based Photo Recoloring paper
(For Example:
TotalColors present in swatch=3
dest_palette=(color1, color2, color3)
orig_palette=(orig_color1, orig_color2, orig_color3)
Replace orig_color1 with color1 in swatch image, orig_color2 with color2 in swatch image and orig_color3 with color3 in swatch image)
ELSE
dest_palette=Pick TotalColors (present in swatch) from user_image_without_background and order them according to Dominant Color Information using colorgram.py library
orig_palette=Pick TotalColors (present in swatch) from swatch image using colorgram.py library
Replace orig_palette to dest_palette in swatch image using algorithm taken from Palette-based Photo Recoloring paper
ENDFOR
END
4. Upload the new swatches containing transferred colors to S3.
5. Return SKU_ID and S3 path of uploaded swatches/texture files to front-end.

In the algorithm above, thread 1 runs the region detection algorithm which identifies different regions of the apparels. Thread 2, during the same time, downloads the texture files that need to be recolored from those detected region to the backend server from the file server. SKU_ID is a unique id to identify the SKU at the backend which matches the image search algorithm and modifies that sku to create the new one. The confidence score defines how much the machine learning algorithm is confident in identifying the property. Based on the confidence score, the system decides how the recoloring and modification will take place. S3 represents a backend server. Visenze Image Search is an example of a third party image search engine which returns the meta tags and visual search results, although other third party search engines may also be used.

The techniques of this disclosure may be implemented in a wide variety of computing devices. Any of the described units, modules or components may be implemented together or separately as discrete but interoperable logic devices. Depiction of different features as applications or units is intended to highlight different functional aspects and does not necessarily imply that such applications or units must be realized by separate hardware or software components. Rather, functionality associated with one or more applications or units may be performed by separate hardware or software components, or integrated within common or separate hardware or software components.

The techniques described in this disclosure may be implemented, at least in part, in hardware, software, firmware or any combination thereof. For example, various aspects of the techniques may be implemented within one or more microprocessors, digital signal processors (DSPs), application specific integrated circuits (ASICs), field programmable gate arrays (FPGAs), or any other equivalent integrated or discrete logic circuitry. The terms "processor," "processing circuitry," "controller" or "control module" may generally refer to any of the foregoing logic circuitry, alone or in combination with other logic circuitry, or any other equivalent circuitry, and alone or in combination with other digital or analog circuitry.

For aspects implemented in software, at least some of the functionality ascribed to the systems and devices described in this disclosure may be embodied as instructions on a computer-readable storage medium such as random access memory (RAM), read-only memory (ROM), non-volatile random access memory (NVRAM), electrically erasable programmable read-only memory (EEPROM), FLASH memory, magnetic media, optical media, or the like that is tangible. The computer-readable storage media may be referred to as non-transitory. A server, client computing device, or any other computing device may also contain a more portable removable memory type to enable easy data transfer or offline data analysis. The instructions may be executed to support one or more aspects of the functionality described in this disclosure.

In some examples, a computer-readable storage medium comprises non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples of the devices, systems, and methods in accordance with the description provided in this disclosure are provided below.

The invention claimed is:

1. A method of virtual representation creation, the method comprising:
  storing, in a memory device, a plurality of meshes, each mesh comprising a virtual three-dimensional (3D) structure defined by a set of data points in a 3D virtual space;
  storing, in the memory device, parameters for the plurality of meshes, wherein each mesh of the plurality of meshes has an associated set of parameters;
  obtaining, by processing circuitry, an image of an apparel;
  analyzing, by processing the circuitry, the image of the apparel to determine parameters of the apparel;
  selecting, by processing the circuitry, a mesh from the plurality of meshes based on the parameters of the apparel, wherein selecting the mesh from the plurality of meshes comprises:
    comparing the parameters of the apparel to the parameters for the plurality of meshes;
    determining which mesh of the plurality of meshes has parameters that most closely match the determined parameters of the apparel; and
    selecting the determined mesh of the plurality of meshes having the parameters that most closely match the determined parameters of the apparel;
  generating, by processing the circuitry, a swatch based on the image of the apparel, wherein the swatch comprises a plurality of maps, the plurality of maps comprising a recolor texture and at least one other map;
  applying, by processing the circuitry, the swatch to the mesh to generate a virtual apparel;
  receiving an image of a user;
  deforming a virtual head representation based on facial features in the image of the user, wherein the virtual head representation includes a head portion and a neck seam, and wherein deforming the virtual head representation comprises deforming the head portion, and avoiding deforming the neck seam;
  rendering the deformed virtual head representation with a body type based on aligning the body type with a neck seam of the deformed virtual head representation to create a virtual representation of the user; and outputting, to a display device, graphical information that includes the virtual apparel rendered over the virtual representation of the user.

2. The method of claim 1, wherein the parameters of the apparel comprise a style parameter for the apparel, and wherein selecting the determined mesh of the plurality of meshes having the parameters that most closely match the determined parameters of the apparel comprises determining, from the plurality of meshes, a mesh with a same style parameter as the style parameter for the apparel, and selecting the determined mesh having the same style parameter.

3. The method of claim 1, wherein the parameters of the apparel comprise a pattern parameter for the apparel, and wherein selecting the determined mesh of the plurality of meshes having the parameters that most closely match the determined parameters of the apparel comprises determining, from the plurality of meshes, a mesh with a same pattern parameter as the pattern parameter for the apparel, and selecting the determined mesh having the same pattern parameter.

4. The method of claim 1, wherein generating the swatch based on the image of the apparel comprises determining a color of the apparel and assigning a color to the swatch based on the color of the apparel .

5. The method of claim 1, wherein generating the swatch based on the image of the apparel comprises determining a texture of the apparel and assigning a texture to the swatch based on the texture of the apparel .

6. The method of claim 1, wherein generating the swatch based on the image of the apparel comprises determining a print of the apparel and assigning a print to the swatch based on the print of the apparel .

7. A device comprising:
one or more memory devices configured to store a plurality of meshes and parameters for the plurality of meshes, wherein each mesh of the plurality of meshes comprises a virtual three-dimensional (3D) structure defined by a set of data points in a 3D virtual space and has an associated set of parameters; and
processing circuitry configured to:
obtain an image of an apparel;
analyze the image of the apparel to determine parameters of the apparel;
select a mesh from the plurality of meshes based on the parameters of the apparel, wherein to select the mesh from the plurality of meshes, the processing circuitry is configured to:
compare the parameters of the apparel to the parameters for the plurality of meshes;
determine which mesh of the plurality of meshes has parameters that most closely match the determined parameters of the apparel; and
select the determined mesh of the plurality of meshes having the parameters that most closely match the determined parameters of the apparel;
generate a swatch based on the image of the apparel, wherein the swatch comprises a plurality of maps, the plurality of maps comprising a recolor texture and at least one other map;
apply the swatch to the mesh to generate a virtual apparel;
receive an image of a user;
deform a virtual head representation based on facial features in the image of the user, wherein the virtual head representation includes a head portion and a neck seam, and wherein to deform the virtual head representation, the processing circuitry deforms the head portion while avoiding deforming the neck seam;
render the deformed virtual head representation with a body type based on aligning the body type with a neck seam of the deformed virtual head representation to create a virtual representation of the user; and
cause a display device to display graphical information that includes the virtual apparel rendered over the virtual representation of the user.

8. The device of claim 7, wherein the parameters of the apparel comprise a style parameter for the apparel, and wherein to select the determined mesh from the plurality of meshes, the processing circuitry is further configured to determine, from the plurality of meshes, a mesh with a same style parameter as the style parameter for the apparel, and select the determined mesh having the same style parameter.

9. The device of claim 7, wherein the parameters of the apparel comprise a pattern parameter for the apparel, and wherein to select the determined mesh from the plurality of meshes, the processing circuitry is further configured to determine, from the plurality of meshes, a mesh with a same pattern parameter as the pattern parameter for the apparel, and select the determined mesh having the same pattern parameter.

10. The device of claim 7, wherein to generate the swatch based on the image of the apparel, the processing circuitry is further configured to determine a color of the apparel and assign a color to the swatch based on the color of the apparel .

11. The device of claim 7, wherein to generate the swatch based on the image of the apparel, the processing circuitry is further configured to determine a texture of the apparel and assign a texture to the swatch based on the texture of the apparel .

12. The device of claim 7, wherein to generate the swatch based on the image of the apparel, the processing circuitry is further configured to determine a print of the apparel and assign a print to the swatch based on the print of the apparel.

13. The device of claim 7, wherein the system comprises a mobile device.

14. A non-transitory computer-readable storage medium storing instructions that when executed cause processing circuitry to:
store a plurality of meshes, each mesh comprising a virtual three-dimensional (3D) structure defined by a set of data points in a 3D virtual space;
store parameters for the plurality of meshes, wherein each mesh of the plurality of meshes has an associated set of parameters;
obtain an image of an apparel;
analyze the image of the apparel to determine parameters of the apparel;
select a mesh from the plurality of meshes based on the parameters of the apparel, wherein to select the mesh from the plurality of meshes, the instructions cause the one or more processors to:
compare the parameters of the apparel to the parameters for the plurality of meshes;
determine which mesh of the plurality of meshes has parameters that most closely match the determined parameters of the apparel; and
select the determined mesh of the plurality of meshes having the parameters that most closely match the determined parameters of the apparel;

generate a swatch based on the image of the apparel, wherein the swatch comprises a plurality of maps, the plurality of maps comprising a recolor texture and at least one other map;

apply the swatch to the mesh to generate a virtual apparel; and receive an image of a user;

deform a virtual head representation based on facial features in the image of the user, wherein the virtual head representation includes a head portion and a neck seam, and wherein to deform the virtual head representation, the instructions cause the one or more processors to deform the head portion while avoiding deforming the neck seam;

render the deformed virtual head representation with a body type based on aligning the body type with a neck seam of the deformed virtual head representation to create a virtual representation of the user; and output graphical information that includes the virtual apparel rendered over the virtual representation of the user.

* * * * *